US012807260B2

(12) United States Patent
Nozaki et al.

(10) Patent No.: US 12,807,260 B2
(45) Date of Patent: Nov. 24, 2026

(54) BICYCLE COMPONENT

(71) Applicant: Shimano Inc., Sakai (JP)

(72) Inventors: Akihiro Nozaki, Sakai (JP); Tomohiro Takimoto, Sakai (JP); Katsuhiro Tachibana, Sakai (JP); Naoki Fujimoto, Sakai (JP); Kentaro Tanaka, Sakai (JP)

(73) Assignee: Shimano Inc., Osaka (JP)

( * ) Notice: Subject to any disclaimer, the term of this patent is extended or adjusted under 35 U.S.C. 154(b) by 72 days.

(21) Appl. No.: 18/413,403

(22) Filed: Jan. 16, 2024

(65) Prior Publication Data

US 2024/0246629 A1 Jul. 25, 2024

Related U.S. Application Data

(63) Continuation-in-part of application No. 18/101,262, filed on Jan. 25, 2023.

(51) Int. Cl.

| | |
|---|---|
| ***B62J 45/20*** | (2020.01) |
| ***B62J 50/21*** | (2020.01) |
| ***B62J 50/22*** | (2020.01) |
| ***B62M 25/08*** | (2006.01) |

(52) U.S. Cl.

CPC ............... *B62J 45/20* (2020.02); *B62J 50/22* (2020.02); *B62J 50/225* (2020.02); *B62M 25/08* (2013.01)

(58) Field of Classification Search

CPC .......... B62J 45/20; B62J 50/22; B62J 50/225; B62M 25/08

USPC .......................................................... 340/432

See application file for complete search history.

(56) References Cited

U.S. PATENT DOCUMENTS

| | | | | |
|---|---|---|---|---|
| 8,655,548 | B2 * | 2/2014 | Ichida | B62M 25/08 439/127 |
| 9,229,712 | B2 * | 1/2016 | Takamoto | B62M 25/08 |
| 9,499,234 | B2 * | 11/2016 | Tetsuka | B62M 25/08 |
| 9,522,714 | B2 | 12/2016 | Komatsu et al. | |
| 9,540,071 | B2 | 1/2017 | Jordan et al. | |
| 10,647,381 | B2 * | 5/2020 | Durdevic | B60K 35/10 |
| 11,787,507 | B2 * | 10/2023 | Ho | H04W 76/14 701/49 |
| 11,964,730 | B2 * | 4/2024 | Lin | B62J 45/00 |
| 2012/0253600 | A1 * | 10/2012 | Ichida | B62K 19/36 701/1 |

(Continued)

FOREIGN PATENT DOCUMENTS

| | | | |
|---|---|---|---|
| CN | 105730602 | A | 7/2016 |
| CN | 106335580 | A | 1/2017 |
| DE | 10 2017 223 836 | A1 | 7/2018 |

*Primary Examiner* — Zhen Y Wu

(74) *Attorney, Agent, or Firm* — Spencer Fane, LLP

(57) ABSTRACT

A bicycle component is basically provided with a wireless communication circuit, a user interface and a controller. The wireless communication circuit is configured to wirelessly communicate with a first additional bicycle component in a first pairing state where a first pairing between the bicycle component and the first additional bicycle component is established. The user interface is configured to accept a user input. The controller is electrically connected to the wireless communication circuit and the user interface. The controller is configured to perform a reset operation to reset the first pairing in response to the user input being provided to the user interface.

26 Claims, 12 Drawing Sheets

(56) References Cited

U.S. PATENT DOCUMENTS

| | | | | |
|---|---|---|---|---|
| 2015/0073656 | A1* | 3/2015 | Takamoto | G06F 9/02 701/1 |
| 2016/0185421 | A1* | 6/2016 | Komatsu | B62M 9/12 701/2 |
| 2016/0257269 | A1* | 9/2016 | Watarai | B62J 43/13 |
| 2016/0295352 | A1* | 10/2016 | Dragomir | H04W 4/80 |
| 2017/0012455 | A1 | 1/2017 | Kato et al. | |
| 2017/0029057 | A1* | 2/2017 | Kato | B62J 6/16 |
| 2018/0115860 | A1* | 4/2018 | Masuda | B62J 1/08 |
| 2018/0178870 | A1* | 6/2018 | Takeshita | B62J 50/22 |
| 2018/0251184 | A1* | 9/2018 | Durdevic | B60K 35/10 |
| 2018/0251188 | A1* | 9/2018 | Durdevic | B60K 35/10 |
| 2019/0009780 | A1* | 1/2019 | Komatsu | B62J 45/20 |
| 2019/0246437 | A1* | 8/2019 | Chuang | H04W 76/11 |
| 2020/0247504 | A1* | 8/2020 | Ho | H04W 76/14 |
| 2020/0377167 | A1* | 12/2020 | Suzuki | B62K 25/04 |
| 2021/0061412 | A1 | 3/2021 | Kawakami et al. | |
| 2021/0171156 | A1* | 6/2021 | Kitano | B62M 9/122 |
| 2021/0276664 | A1* | 9/2021 | Yang | B62K 23/06 |
| 2021/0284284 | A1* | 9/2021 | Ho | B62L 3/02 |
| 2022/0346159 | A1 | 10/2022 | Zhu et al. | |
| 2022/0371681 | A1* | 11/2022 | Lin | B60R 16/027 |
| 2022/0371688 | A1* | 11/2022 | Lin | B62J 45/00 |
| 2023/0109945 | A1* | 4/2023 | Garnica | B62J 45/20 701/51 |

* cited by examiner

BICYCLE COMPONENT

CROSS-REFERENCE TO RELATED APPLICATIONS

This application is a continuation-in-part application of U.S. patent application Ser. No. 18/101,262, which was filed on Jan. 25, 2023. The entire disclosures of U.S. patent application Ser. No. 18/101,262 is hereby incorporated herein by reference.

BACKGROUND

Technical Field

This disclosure generally relates to a bicycle component. More specifically, the present disclosure relates to a bicycle component configured to wirelessly communicate with one or more additional bicycle components.

Background Information

In recent years, some bicycles are provided with electric components or devices to make it easier for the rider to operate the bicycle. Examples of such electrical bicycle components include suspensions, transmission devices (e.g., derailleurs, internally geared hubs, etc.), operating devices and seatposts. Many of these electrical bicycle components are configured to communicate with one or more additional bicycle components. In more recent years, some bicycle components are wirelessly interconnected.

SUMMARY

Generally, the present disclosure is directed to various features of a bicycle component to configured to wirelessly communicate one or more additional bicycle components.

In view of the state of the known technology and in accordance with a first aspect of the present disclosure, a bicycle component is provided that basically comprises a wireless communication circuit, a user interface and a controller. The wireless communication circuit is configured to wirelessly communicate with a first additional bicycle component in a first pairing state where a first pairing between the bicycle component and the first additional bicycle component is established. The user interface is configured to accept a user input. The controller is electrically connected to the wireless communication circuit and the user interface. The controller is configured to perform a reset operation to reset the first pairing in response to the user input being provided to the user interface.

With the bicycle component according to the first aspect, it is possible to reset the wireless communication of the bicycle component so that the bicycle component can be paired with a second additional bicycle component.

In accordance with a second aspect of the present disclosure, the bicycle component according to the first aspect further comprises a component body provided with the user interface.

With the bicycle component according to the second aspect, the user interface can be easily operated by a user.

In accordance with a third aspect of the present disclosure, the bicycle component according to the second aspect is configured so that the component body includes a base member and a movable mechanism. The base member is configured to be mounted to a bicycle frame. The movable mechanism is configured to move with respect to the base member. At least one of the base member and the movable mechanism is provided with the user interface.

With the bicycle component according to the third aspect, the user interface can be located to be easily operated by a user.

In accordance with a fourth aspect of the present disclosure, the bicycle component according to any one of the first aspect to the third aspect further comprises a circuit board and a housing. At least one of the user interface and the controller is provided to the circuit board. The housing accommodates the circuit board, the user interface being exposed on an exterior of the housing.

With the bicycle component according to the fourth aspect, it is easier to locate the user interface in view size and cost of the bicycle component by providing the circuit board in the housing with the user interface being exposed on an exterior of the housing.

In accordance with a fifth aspect of the present disclosure, the bicycle component according to any one of the first aspect to the fourth aspect is configured so that the controller is configured to perform the reset operation after the user input is provided to the user interface for a first predetermined time.

With the bicycle component according to the fifth aspect, an inadvertent reset operation can be reliably avoided.

In accordance with a sixth aspect of the present disclosure, the bicycle component according to any one of the first aspect to the fifth aspect further comprises a notification device configured to be controlled by the controller.

With the bicycle component according to the sixth aspect, it is possible to notify a user when an operating state of the bicycle component has changed.

In accordance with a seventh aspect of the present disclosure, the bicycle component according to the sixth aspect is configured so that the notification device includes a light emitting device.

With the bicycle component according to the seventh aspect, a user can be easily and reliably notified of an operating state of the bicycle component using a light emitting device.

In accordance with an eighth aspect of the present disclosure, the bicycle component according to the sixth aspect or the seventh aspect is configured so that the controller is configured to control the notification device to produce a notification in response to the user input being provided to the user interface.

With the bicycle component according to the eighth aspect, a user can be notified of that the user input has been received by the controller.

In accordance with a ninth aspect of the present disclosure, the bicycle component according to any one of the first aspect to the eighth aspect is configured so that the wireless communication circuit is configured to wirelessly communicate with a second additional bicycle component in a second pairing state where a second pairing between the bicycle component and the second additional bicycle component is established, and the controller is configured to perform the second pairing in response to a second user input being provided to a second user interface.

With the bicycle component according to the ninth aspect, it is possible to easily and reliably pair the bicycle component with a second additional bicycle component.

In accordance with a tenth aspect of the present disclosure, the bicycle component according to the ninth aspect is configured so that the controller is configured to perform the reset operation to reset the first pairing in response to a remote user input being provided to a remote user interface of a remote communication device, and the controller is configured to perform the second pairing in response to a second user input being provided to a second user interface.

With the bicycle component according to the tenth aspect, it is possible to easily and reliably pair the bicycle component with a second additional bicycle component using a remote user interface.

In accordance with an eleventh aspect of the present disclosure, a bicycle component is provided that basically comprises a wireless communication circuit and a controller. The wireless communication circuit is configured to wirelessly communicate with a first additional bicycle component in a first pairing state where a first pairing between the bicycle component and the first additional bicycle component is established. The wireless communication circuit is configured to wirelessly communicate with a second additional bicycle component in a second pairing state where a second pairing between the bicycle component and the second additional bicycle component is established. The controller is electrically connected to the wireless communication circuit. The controller is configured to perform a reset operation to reset the first pairing in response to a remote user input being provided to a remote user interface of a remote communication device. The controller is configured to perform the second pairing in response to a second user input being provided to a second user interface of the second additional bicycle component.

With the bicycle component according to the eleventh aspect, it is possible to reset the wireless communication of the bicycle component, and then pair the bicycle component paired with a second additional bicycle component.

In accordance with a twelfth aspect of the present disclosure, the bicycle component according to any one of the ninth aspect to the eleventh aspect is configured so that the controller is configured to control the wireless communication circuit to send a connection signal in response to the second user input.

With the bicycle component according to the twelfth aspect, a user can easily and reliably pair the bicycle component with the second additional bicycle component using the second user input of the second additional bicycle component.

In accordance with a thirteenth aspect of the present disclosure, the bicycle component according to any one of the ninth aspect to the twelfth is configured so that the second user interface includes a power interface configured to control power supplied to the bicycle component.

With the bicycle component according to the thirteenth aspect, a user can easily and reliably control the power being supplied to the bicycle component.

In accordance with a fourteenth aspect of the present disclosure, the bicycle component according to any one of the ninth aspect to the thirteenth aspect further comprises a wired communication circuit configured to be electrically connected to the second additional bicycle component via a first electrical cable.

With the bicycle component according to the fourteenth aspect, the bicycle component and the second additional bicycle component can reliably communicate even in a case where the wireless communication is disrupted.

In accordance with a fifteenth aspect of the present disclosure, the bicycle component according to any one of the ninth aspect to the fourteenth aspect is configured so that the second additional bicycle component is configured to be electrically connected to a third additional bicycle component via a second electrical cable.

With the bicycle component according to the fifteenth aspect, the second additional bicycle component can be easily electrically connected the third additional bicycle component via the second electrical cable.

In accordance with a sixteenth aspect of the present disclosure, the bicycle component according to the fifteenth aspect is configured so that the controller is electrically connected to an electrical power source remote from the bicycle component. The electrical power source is electrically connected to the third additional bicycle component.

With the bicycle component according to the sixteenth aspect, the controller of the bicycle component can receive electrical power from an electrical power source that also supplies electrical power to the third additional bicycle component.

In accordance with a seventeenth aspect of the present disclosure, the bicycle component according to the fifteenth aspect or the sixteenth aspect is configured so that the second additional bicycle component is configured to communicate with the third additional bicycle component.

With the bicycle component according to the seventeenth aspect, the second additional bicycle component can communicate with the third additional bicycle component.

In accordance with an eighteenth aspect of the present disclosure, the bicycle component according to any one of the ninth aspect to the seventeenth aspect is configured so that the controller is further configured to receive a control signal from a fourth additional bicycle component different from the second additional bicycle component.

With the bicycle component according to the eighteenth aspect, the bicycle component can be remotely controlled by a fourth additional bicycle component that is different from the second additional bicycle component.

In accordance with a nineteenth aspect of the present disclosure, the bicycle component according to any one of the ninth aspect to the eighteenth aspect is configured so that the controller is further configured to finish resetting the first pairing before the second pairing is established.

With the bicycle component according to the nineteenth aspect, the bicycle component can be appropriately and reliably paired to the second additional bicycle component.

In accordance with a twentieth aspect of the present disclosure, the bicycle component according to any one of the first aspect to the nineteenth aspect further comprises a storage device configured to store a first device identification that identifies the first additional bicycle component as a source of a wireless signal as coming from the first additional bicycle component.

With the bicycle component according to the twentieth aspect, the bicycle component can reliably communicate with the first additional bicycle component based on the first additional bicycle component stored in the storage device.

In accordance with a twenty-first aspect of the present disclosure, the bicycle component according to the twentieth aspect is configured so that the controller is configured to clear the first device identification stored in the storage device during the reset operation.

With the bicycle component according to the twenty-first aspect, it is possible to reduce improper pairing of the bicycle component with other devices.

In accordance with a twenty-second aspect of the present disclosure, the bicycle component according to any one of the first aspect to the twenty-first aspect is configured so that the bicycle component includes one of a derailleur, an internal geared hub, a suspension, an adjustable seatpost and a drive unit.

With the bicycle component according to the twenty-second aspect, the wireless communication of one of a derailleur, an internal geared hub, a suspension, an adjustable seatpost and a drive unit with an additional bicycle component can be easily and reliably established.

In accordance with a twenty-third aspect of the present disclosure, a second additional bicycle component is provided that comprises a second wireless communication circuit, a second user interface and a second controller. The second wireless communication circuit is configured to wirelessly communicate with a bicycle component in a state where a first pairing between the bicycle component and a first additional bicycle component has been reset and a second pairing between the bicycle component and the second additional bicycle component is established. The second user interface is configured to accept a second user input. The second controller is electrically connected to the second wireless communication circuit and the second user interface. The second controller is configured to perform the second pairing between the bicycle component and the second additional bicycle component in response to the second user input being provided to the second user interface where the first pairing between the first additional bicycle component and the bicycle component has been reset. The second user interface includes a power interface configured to control power supplied to the bicycle component.

With the second additional bicycle component according to the twenty-third aspect, the second additional bicycle component can be easily and reliably paired with the bicycle component where the bicycle component was previously paired with the first additional bicycle component.

In accordance with a twenty-fourth aspect of the present disclosure, the second additional bicycle component according to the twenty-third aspect further comprises a second wired communication circuit configured to be electrically connected to the bicycle component via a first electrical cable.

With the second additional bicycle component according to the twenty-fourth aspect, the second additional bicycle component and the bicycle component can reliably communicate even in a case where the wireless communication is disrupted.

In accordance with a twenty-fifth aspect of the present disclosure, the second additional bicycle component according to the twenty-third aspect or the twenty-fourth aspect is configured so that the second additional bicycle component is configured to be electrically connected to a third additional bicycle component via a second electrical cable.

With the second additional bicycle component according to the twenty-fifth aspect, the second additional bicycle component can be easily electrically connected the third additional bicycle component via the second electrical cable.

In accordance with a twenty-sixth aspect of the present disclosure, the second additional bicycle component according to the twenty-fifth aspect is configured so that the second controller is electrically connected to an electrical power source remote from the second additional bicycle component, the electrical power source is electrically connected to the third additional bicycle component.

With the second additional bicycle component according to the twenty-sixth aspect, the controller of the bicycle component can receive electrical power from an electrical power source that also supplies electrical power to the third additional bicycle component.

In accordance with a twenty-seventh aspect of the present disclosure, the second additional bicycle component according to the twenty-fifth aspect or the twenty-sixth aspect is configured so that the second additional bicycle component is configured to operate the third additional bicycle component differently from the bicycle component.

With the second additional bicycle component according to the twenty-seventh aspect, the second bicycle component can remotely control by the third additional bicycle component differently from the bicycle component.

Also, other objects, features, aspects and advantages of the disclosed bicycle component will become apparent to those skilled in the art from the following detailed description, which, taken in conjunction with the annexed drawings, discloses preferred embodiments of the bicycle component.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Referring initially to FIGS. 1 to 4, a first bicycle B1 (FIGS. 1 and 2) is illustrated being equipped with a first bicycle system 10A, and a second bicycle B2 (FIGS. 3 and 4) is illustrated being equipped with a second bicycle system 10B in accordance with one illustrated embodiment. Here, the first bicycle B1 and the second bicycle B2 are illustrated as e-bikes that uses a driving force of an electric motor in addition to a human driving force for propulsion. However, the first bicycle system 10A and the second bicycle system 10B can be applied to any other type of bicycles such as, for example, a mountain bike, a cyclocross bicycle, a gravel bike, a city bike, a cargo bike, and a recumbent bike. Moreover, while the first bicycle B1 and the second bicycle B2 are illustrated as being identical, it will be apparent from this disclosure that the first bicycle B1 and the second bicycle B2 can be different types of bicycles with different bicycle components.

The first bicycle B1 and the second bicycle B2 are each equipped with a plurality of bicycle components BC. At least two of these bicycle components BC are wireless bicycle components BC for each of the first bicycle B1 and the second bicycle B2. Basically, in the illustrated embodiment, at least one of the wireless bicycle components BC of the first bicycle system 10A is relocated to the second bicycle system 10B. As a result, the relocated wireless bicycle component BC will need to be paired with at least one of the wireless bicycle components BC of the second bicycle B2. Also, preferably, the device identification of the relocated wireless bicycle component BC is reset so that the relocated wireless bicycle components BC can not wirelessly communicate with the wireless bicycle components BC of the first bicycle system 10A.

Figure 1:
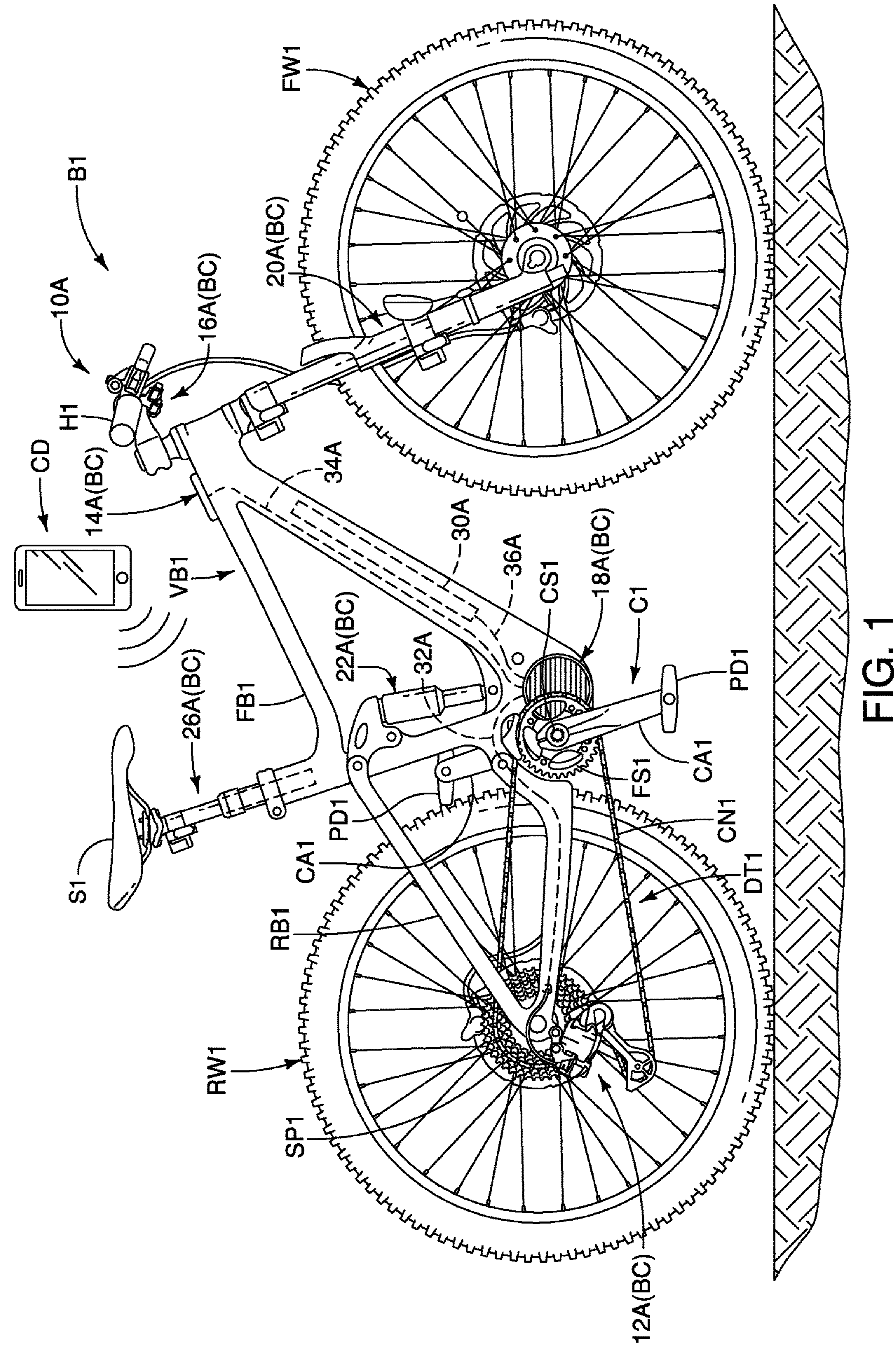
FIG. 1 is a side elevational view of a first bicycle that is equipped with a plurality of bicycle components in accordance with illustrated embodiment of the present disclosure.
Figure 2:
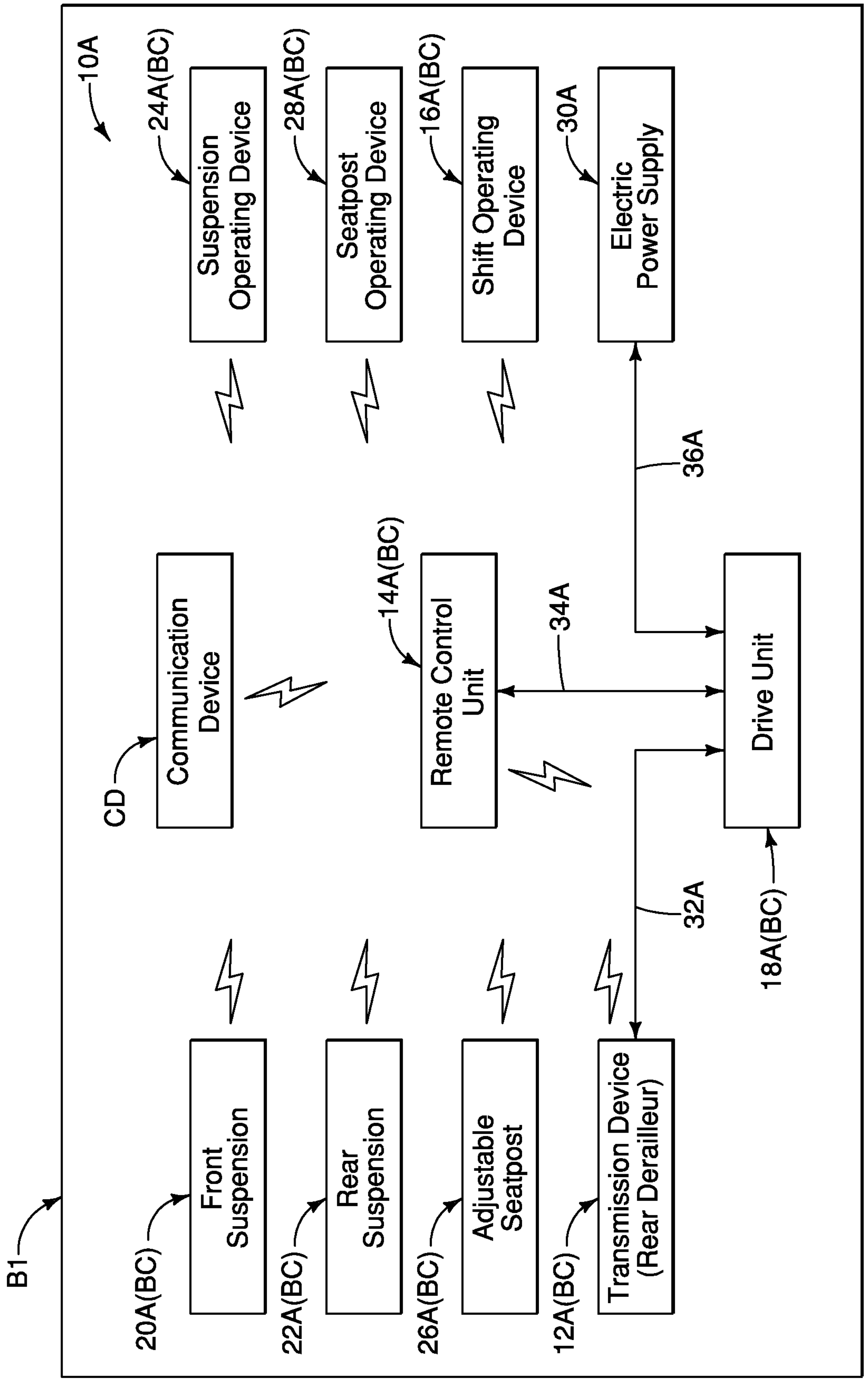
FIG. 2 is an overall schematic block diagram of a first bicycle system of the first bicycle illustrated in FIG. 1.

Referring to FIGS. 1 and 2, here, the first bicycle system 10A of the first bicycle B1 includes the following bicycle components BC: a transmission device 12A, a remote control unit 14A, a shift operating device 16A, a drive unit 18A, a front suspension 20A, a rear suspension 22A, a suspension operating device 24A, an adjustable seatpost 26A and a seatpost operating device 28A. Here, each of the bicycle components 12A, 14A, 16A, 18A, 20A, 22A, 24A, 26A, and 28A are wireless bicycle components. Of course, it will be apparent from this disclosure that some of the bicycle components BC can be omitted from the first bicycle system 10A of the first bicycle B1 and other bicycle components can be included the first bicycle system 10A of the first bicycle B1 as needed and/or desired. For example, in the illustrated embodiment, the transmission device 12A is a rear derailleur. However, the transmission device 12A can include a front derailleur and an internal geared hub. As mentioned above, one of the bicycle components BC (e.g., the bicycle components 12A, 14A, 16A, 18A, 20A, 22A, 24A, 26A, and 28A) are configured so that they can be detached from the first bicycle B1 and attached to the second bicycle B2. Preferably, for example, the bicycle component BC includes one of a derailleur, an internal geared hub, a suspension, an adjustable seatpost and a drive unit. Also, for example, the shift operating device 16A, the suspension operating device 24A, the adjustable seatpost 26A and the seatpost operating device 28A can be replaced with a single operating device that is configured to perform all of their functions.

Here, the first bicycle system 10A further includes a remote communication device CD. The communication device CD can be a smartphone, a tablet, a cycle computer or some other device having a wireless communication circuit that can communicate with one or more of the bicycle components BC (e.g., the bicycle components 12A, 14A, 16A, 18A, 20A, 22A, 24A, 26A, and 28A). As explained below, the remote communication device CD is preferably configured to communicate with at least one of the bicycle components BC (e.g., the bicycle components 12A, 14A, 16A, 18A, 20A, 22A, 24A, 26A, and 28A) to instruct the bicycle component BC to perform a reset operation. The term "reset operation" as used herein does not include a "re-pairing operation". Also, the term "reset" as used herein does not mean re-pairing. Rather, the term "reset" as used herein refers to clearing information that was stored wireless communication and does not include re-pairing. Thus, for example, a rest or reset operation means that device identification(s) is cleared from the bicycle component but does not include re-pairing.

As shown in FIG. 1, the first bicycle B1 includes a vehicle body VB1 that is supported by a rear wheel RW1 and a front wheel FW1. The vehicle body VB1 basically includes a front frame body FB1 and a rear frame body RB1 (a swing arm). The vehicle body VB1 is also provided with a handlebar H1 for steering the front wheel FW1. The first bicycle B1 further includes a drivetrain DT1 for inputting a propulsion force to rotate the rear wheel RW1. Here, for example, the drivetrain DT1 is a chain-drive type that includes a crank C1, at least one front sprocket FS1, a plurality of rear sprockets SP1 and a chain CN1. The crank C1 includes a crank axle CS1 and a pair of crank arms CA1. The crank axle CS1 is rotatably supported to the front frame body FB1 via the drive unit 18A. The crank arms CA1 are provided on opposite ends of the crank axle CS1. A pedal PD1 is rotatably coupled to the distal end of each of the crank arms CA1. While the drivetrain DT1 is illustrated as a chain-drive type of drivetrain, the drivetrain DT1 can be selected from any type of drivetrain, and can be a belt-drive type or a shaft-drive type. The front sprocket FS1 is provided on the crank C1 to rotate integrally with the crank axle CS1. The rear sprockets SP1 are provided on a hub of the rear wheel RW1. The chain CN1 runs around the front sprocket FS1 and the rear sprockets SP1. A human driving force is applied to the pedals PD1 by a rider such that the driving force is transmitted via the front sprocket FS1, the chain CN1 and the rear sprockets SP1 to the rear wheel RW1.

The transmission device 12A (hereinafter referred to as the rear derailleur 12A) is mounted to the rear frame body RB1 in a conventional manner. The rear derailleur 12A is an example one of the bicycle components BC. The rear derailleur 12A is controlled by the remote control unit 14A and the shift operating device 16A as discussed below. Here, the rear derailleur 12A is configured to wirelessly communicate with the remote control unit 14A and the shift operating device 16A. The rear derailleur 12A is basically a conventional rear derailleur, except that the rear derailleur 12A has been modified to perform a reset operation as discussed below. Thus, the conventional structures of the rear derailleur 12A will only be briefly discussed herein.

The remote control unit 14A is mounted to the top tube of the front frame body FB1. The remote control unit 14A is an example one of the bicycle components BC. The remote control unit 14A is configured to wirelessly transmit wireless signals that include each a device identification that identifies the source of the wireless signal as coming from the remote control unit 14A. The remote control unit 14A can be provided with its own electric power source (e.g., one or more rechargeable batteries), or can be electrically connected to a remote electric power source. The rear derailleur 12A and the remote control unit 14A are configured to wirelessly communicate with each other after being paired. Basically, the remote control unit 14A is configured to receive wireless signals from the rear derailleur 12A for indicating one or more operating conditions of the rear derailleur 12A, and send wireless signals to the rear derailleur 12A for operating the rear derailleur 12A. For example, the remote control unit 14A can change the rear derailleur 12A from a manual shifting mode to an automatic shifting mode. Also, the remote control unit 14A and the drive unit 18A are configured to wirelessly communicate with each other after being paired. Basically, the remote control unit 14A is configured to receive wireless signals from the drive unit 18A for indicating one or more operating conditions of the drive unit 18A, and send wireless signals to the drive unit 18A for changing an operating conditions of the drive unit 18A. For example, the remote control unit 14A can change an operating mode of the drive unit 18A. The operating modes include, for example, a high assist mode, a normal assist mode, an eco assist mode, a walk assist mode and an off mode. The high assist mode is an assist mode that provides a greater assist power than at the normal assist mode within a predetermined speed range. The eco assist mode is an assist mode that provides a lower assist power than at normal assist mode within a predetermined speed range. The walk assist mode is an assist mode that drives the motor of the drive unit 18A such that the first bicycle B1 travels at a predetermined speed for a user to walk beside the first bicycle B1 at a comfortable walking speed. Also, as explained below, the remote control unit 14A and the drive unit 18A are configured to communicate with each other through wired communication without pairing. Moreover, the wireless communication circuit of the drive unit 18A can be omitted such that the remote control unit 14A and the drive unit 18A only communicate via wired communication.

The shift operating device 16A is preferably configured to be mounted to the handlebar H1 in a conventional manner. For example, the shift operating device 16A is mounted to the right side of the handlebar H1 adjacent to an inner end of the right hand grip. The shift operating device 16A is an example one of the bicycle components BC. The shift operating device 16A is configured to wirelessly transmit wireless signals that include each a device identification that identifies the source of the wireless signal as coming from the shift operating device 16A. Here, the first operating device 14 is provided with its own electrical power supply (e.g., one or more rechargeable batteries). The rear derailleur 12A and the shift operating device 16A are configured to wirelessly communicate with each other after being paired. Basically, the shift operating device 16A is configured to output wireless signals to the rear derailleur 12A for performing a shifting operation.

The drive unit 18A is mounted to the vehicle body VB1. Basically, the drive unit 18A includes an electric assist device that is configured to apply a propulsion force to the first bicycle B1. Here, the crank axle CA1 is integrated into the drive unit 18A. The crank axle CA1 is operatively connected to the electric motor of the drive unit 18A such that the crank axle CA1 is rotated by the electric motor of the drive unit 18A. Since drive units that assist in the propulsion force of a bicycle are well known in the bicycle, the drive unit 18A will not be discussed in further detail.

Here, as seen in FIG. 1, the front suspension 20A is pivotally coupled at its upper end to the front frame body FB1, and rotatably supports the front wheel FW1 at its lower end. Namely, the front suspension 20A is configured to absorb shocks transmitted from the front wheel FW1. The rear frame body RB1 is swingably mounted to a rear section of the front frame body FB1 such that the rear frame body RB1 can pivot with respect to the front frame body FB1. The rear wheel RW1 is mounted to a rear end of the rear frame body RB1. The rear suspension 22A is a rear shock absorber that is operatively disposed between the front frame body FB1 and the rear frame body RB1. The rear suspension 22A is provided between the front frame body FB1 and the rear frame body RB1 to control the movement of the rear frame body RB1 with respect to the front frame body FB1. Namely, the rear suspension 22A absorbs shocks transmitted from the rear wheel RW1. Here, the front suspension 20A and the rear suspension 22A are configured to be adjusted between various states. For example, the front suspension 20A and the rear suspension 22A are configured to be adjustable different damping (stiffness) states and different stroke lengths.

Preferably, the suspension operating device 24A is preferably configured to be mounted to the handlebar H1 in a conventional manner. For example, the suspension operating device 24A is mounted to the left side of the handlebar H1 adjacent to an inner end of the left hand grip. The suspension operating device 24A can be configured to control a suspension stiffness setting and/or a suspension stroke setting of both the front suspension 20A and the rear suspension 22A. Alternatively, the front suspension 20A and the rear suspension 22A can each have its own separate operating device as needed and/or desired. The suspension operating device 24A is configured to wirelessly communicate with the front suspension 20A and the rear suspension 22A for individually changing the suspension stiffness setting and/or the suspension stroke setting of the front suspension 20A and the rear suspension 22A.

Here, as seen in FIG. 1, the adjustable seatpost 26A is mounted to a seat tube of the front frame body FB1 in a conventional manner and supports the bicycle seat or saddle S1 in any suitable manner. The seatpost operating device 28A is configured to control the adjustable seatpost 26A to adjust the height of the saddle S1 relative the front frame body FB1. Preferably, the seatpost operating device 28A is preferably configured to be mounted to the handlebar H1 in a conventional manner. For example, the seatpost operating device 28A is mounted to the left side of the handlebar H1 adjacent to the suspension operating device 24A. The seatpost operating device 28A is configured to wirelessly communicate with the adjustable seatpost 26A for changing a height setting of the adjustable seatpost 26A.

Here, the first bicycle B1 further includes an electric power source 30A. Basically, in the illustrated embodiment, the electric power source 30A is electrically connected to the rear derailleur 12A, the remote control unit 14A and the drive unit 18A for supplying electrical power to them. Preferably, each of the bicycle components 16A, 20A, 22A, 24A, 26A, and 28A includes its own electric power source. Alternatively, the electric power source 30A can be further electrically connected to one or more of the other bicycle components BC (e.g., the bicycle components 16A, 20A, 22A, 24A, 26A, and 28A) as needed and/or desired. Here, the electric power source 30A is a battery pack that includes one or more batteries. As illustrated in FIG. 1, the electric power source 30A is located in the downtube of the front frame body FB1. Alternatively, the electric power source 30A can be attached an outer surface of the front frame body FB1. The electric power source 30A can also be disposed in other locations such as in the seat tube. The electric power source 30A preferably includes one or more rechargeable batteries. The electric power source 30A is configured to supply electrical power to the rear derailleur 12A, the remote control unit 14A and the drive unit 18A. In particular, as seen in FIG. 2, the rear derailleur 12A is electrically connected to an electrical junction of the drive unit 18A by a first electrical cable 32A, and the remote control unit 14A is electrically connected to the electrical junction of the drive unit 18A by a second electrical cable 34A. The electrical junction of the drive unit 18A is then connected to the electric power source 30A by a third electrical cable 36A. In this way, electrical power from the electric power source 30A is supplied to the rear derailleur 12A, the remote control unit 14A and the drive unit 18A. Preferably, the first electrical cable 32A, the second electrical cable 34A and the third electrical cable 36A have pluggable electrical connectors provided at one or both ends for easy connection and disconnection.

Alternatively, the rear derailleur 12A can be directly connected to the electric power source 30A to receive the electrical power directly from the electric power source 30A. Likewise, alternatively, the remote control unit 14A can be directly connected to the electric power source 30A to receive the electrical power directly from the electric power source 30A. Also, alternatively, the remote control unit 14A can be directly connected to the rear derailleur 12A to receive the electrical power via the drive unit 18A and the rear derailleur 12A from the electric power source 30A.

Figure 3:
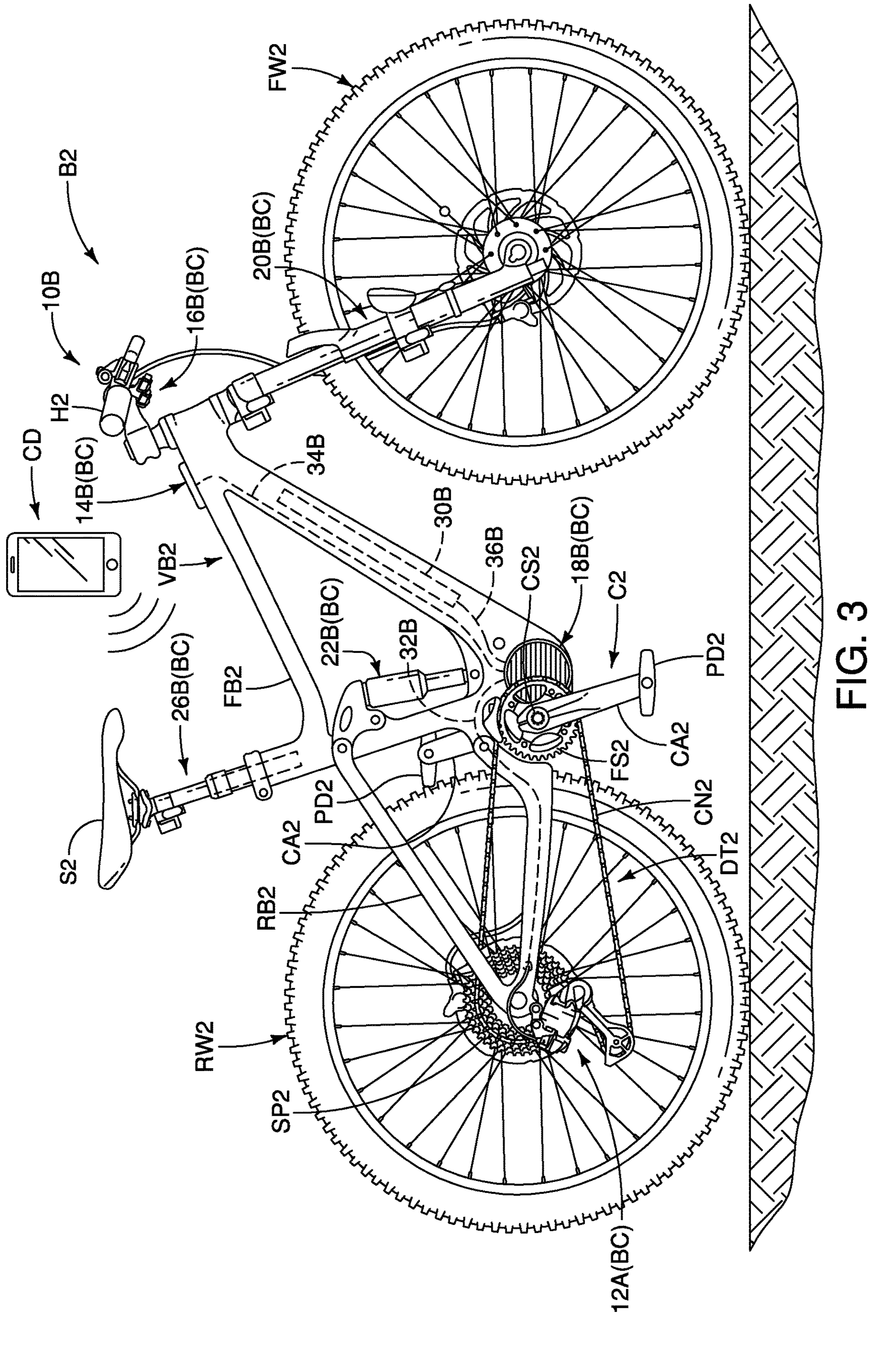
FIG. 3 is a side elevational view of a second bicycle that is equipped with a plurality of bicycle components in accordance with illustrated embodiment of the present disclosure.

As shown in FIG. 3, the second bicycle B2 includes a vehicle body VB2 that is supported by a rear wheel RW2 and a front wheel FW2. The vehicle body VB2 basically includes a front frame body FB2 and a rear frame body RB2 (a swing arm). The vehicle body VB2 is also provided with a handlebar H2 for steering the front wheel FW2. The second bicycle B2 further includes a drivetrain DT2 for inputting a propulsion force to rotate the rear wheel RW2. Here, for example, the drivetrain DT2 is a chain-drive type that includes a crank C2, at least one front sprocket FS2, a plurality of rear sprockets SP2 and a chain CN2. The crank C2 includes a crank axle CS2 and a pair of crank arms CA2. The crank axle CS2 is rotatably supported to the front frame body FB2 via the drive unit 18B. The crank arms CA2 are provided on opposite ends of the crank axle CS2. A pedal PD2 is rotatably coupled to the distal end of each of the crank arms CA2. While the drivetrain DT2 is illustrated as a chain-drive type of drivetrain, the drivetrain DT2 can be selected from any type of drivetrain, and can be a belt-drive type or a shaft-drive type. The front sprocket FS2 is provided on the crank C2 to rotate integrally with the crank axle CS2. The rear sprockets SP2 are provided on a hub of the rear wheel RW2. The chain CN2 runs around the front sprocket FS2 and the rear sprockets SP2. A human driving force is applied to the pedals PD2 by a rider such that the driving force is transmitted via the front sprocket FS2, the chain CN2 and the rear sprockets SP2 to the rear wheel RW2.

The second bicycle system 10B of the second bicycle B2 includes the following bicycle components BC: the transmission device 12A (the rear derailleur 12A of the first bicycle system 10A), a remote control unit 14B, a shift operating device 16B, a drive unit 18B, a front suspension 20B, a rear suspension 22B, a suspension operating device 24B, an adjustable seatpost 26B and a seatpost operating device 28B. Here, each of the bicycle components 12A, 14B, 16B, 18B, 20B, 22B, 24B, 26B, and 28B are wireless bicycle components. Of course, it will be apparent from this disclosure that some of the bicycle components BC can be omitted from the second bicycle system 10B of the second bicycle B2 and other bicycle components can be included the second bicycle system 10B of the second bicycle B2 as needed and/or desired. For example, in the illustrated embodiment, the transmission device 12A is a rear derailleur. However, the transmission device 12A can include a front derailleur and an internal geared hub. As mentioned above, one of the bicycle components BC (e.g., the bicycle components 12A, 14B, 16B, 18B, 20B, 22B, 24B, 26B, and 28B) are configured so that they can be detached from the first bicycle B1 and attached to the second bicycle B2. Preferably, for example, the bicycle component BC includes one of a derailleur, an internal geared hub, a suspension, an adjustable seatpost and a drive unit. Also, for example, the shift operating device 16B, the suspension operating device 24B, the adjustable seatpost 26B and the seatpost operating device 28B can be replaced with a single operating device that is configured to perform all of their functions.

The rear derailleur 12A is mounted to the rear frame body RB2 in a conventional manner. When the rear derailleur 12A is mounted to the second bicycle B2, the rear derailleur 12A is controlled by the remote control unit 14B and the shift operating device 16B as discussed below.

The remote control unit 14B is mounted to the top tube of the front frame body FB2. The remote control unit 14B is an example one of the bicycle components BC. The remote control unit 14B is configured to wirelessly transmit wireless signals that include each a device identification that identifies the source of the wireless signal as coming from the remote control unit 14B. The remote control unit 14B can be provided with its own electric power source (e.g., one or more rechargeable batteries), or can be electrically connected to a remote electric power source. The rear derailleur 12A and the remote control unit 14B are configured to wirelessly communicate with each other after being paired. Basically, the remote control unit 14B is configured to receive wireless signals from the rear derailleur 12A for indicating one or more operating conditions of the rear derailleur 12A, and send wireless signals to the rear derailleur 12A for changing an operating conditions of the rear derailleur 12A. For example, the remote control unit 14B can change the rear derailleur 12A from a manual shifting mode to an automatic shifting mode. Also, the remote control unit 14B and the drive unit 18B are configured to wirelessly communicate with each other after being paired. Basically, the remote control unit 14B is configured to receive wireless signals from the drive unit 18B for indicating one or more operating conditions of the drive unit 18B, and send wireless signals to the drive unit 18B for changing an operating conditions of the drive unit 18B. For example, the remote control unit 14B can change an operating mode of the drive unit 18B. The operating modes include, for example, a high assist mode, a normal assist mode, an eco assist mode, a walk assist mode and an off mode.

The shift operating device 16B is preferably configured to be mounted to the handlebar H2 in a conventional manner. For example, the shift operating device 16B is mounted to the right side of the handlebar H2 adjacent to an inner end of the right hand grip. The shift operating device 16B is an example one of the bicycle components BC. The shift operating device 16B is configured to wirelessly transmit wireless signals that include each a device identification that identifies the source of the wireless signal as coming from the shift operating device 16B. Here, the first operating device 14 is provided with its own electrical power supply (e.g., one or more rechargeable batteries). The rear derailleur 12A and the shift operating device 16B are configured to wirelessly communicate with each other after being paired. Basically, the shift operating device 16B is configured to output wireless signals to the rear derailleur 12A for performing a shifting operation.

The drive unit 18B is mounted to the vehicle body VB2. Basically, the drive unit 18B includes an electric assist device that is configured to apply a propulsion force to the first bicycle B1. Here, the crank axle CA1 is integrated into the drive unit 18B. The crank axle CA1 is operatively connected to the electric motor of the drive unit 18B such that the crank axle CA1 is rotated by the electric motor of the drive unit 18B. Since drive units that assist in the propulsion force of a bicycle are well known in the bicycle, the drive unit 18B will not be discussed in further detail.

Also, the remote control unit 14B and the drive unit 18B are configured to wirelessly communicate with each other after being paired. Basically, the remote control unit 14B is configured to receive wireless signals from the drive unit 18B for indicating one or more operating conditions of the drive unit 18B, and send wireless signals to the drive unit 18B for changing an operating conditions of the drive unit 18B. For example, the remote control unit 14B can change an operating mode of the drive unit 18B. The operating modes include, for example, a high assist mode, a normal assist mode, an eco assist mode, a walk assist mode and an off mode. The high assist mode is an assist mode that provides a greater assist power than at the normal assist mode within a predetermined speed range. The eco assist mode is an assist mode that provides a lower assist power than at normal assist mode within a predetermined speed range. The walk assist mode is an assist mode that drives the motor of the drive unit 18B such that the second bicycle B2 travels at a predetermined speed for a user to walk beside the second bicycle B2 at a comfortable walking speed. Also, as explained below, the remote control unit 14B and the drive unit 18B are configured to communicate with each other through wired communication without pairing. Moreover, the wireless communication circuit of the drive unit 18B can be omitted such that the remote control unit 14B and the drive unit 18B only communicate via wired communication.

Here, as seen in FIG. 3, the front suspension 20B is pivotally coupled at its upper end to the front frame body FB2, and rotatably supports the front wheel FW2 at its lower end. Namely, the front suspension 20B is configured to absorb shocks transmitted from the front wheel FW2. The rear frame body RB2 is swingably mounted to a rear section of the front frame body FB2 such that the rear frame body RB2 can pivot with respect to the front frame body FB2. The rear wheel RW2 is mounted to a rear end of the rear frame body RB2. The rear suspension 22B is a rear shock absorber that is operatively disposed between the front frame body FB2 and the rear frame body RB2. The rear suspension 22B is provided between the front frame body FB2 and the rear frame body RB2 to control the movement of the rear frame body RB2 with respect to the front frame body FB2. Namely, the rear suspension 22B absorbs shocks transmitted from the rear wheel RW2. Here, the front suspension 20B and the rear suspension 22B are configured to be adjusted between various states. For example, the front suspension 20B and the rear suspension 22B are configured to be adjustable different damping (stiffness) states and different stroke lengths.

Preferably, the suspension operating device 24B is preferably configured to be mounted to the handlebar H2 in a conventional manner. For example, the suspension operating device 24B is mounted to the left side of the handlebar H2 adjacent to an inner end of the left hand grip. The suspension operating device 24B can be configured to control a suspension stiffness setting and/or a suspension stroke setting of both the front suspension 20B and the rear suspension 22B. Alternatively, the front suspension 20B and the rear suspension 22B can each have its own separate operating device as needed and/or desired. The suspension operating device 24B is configured to wirelessly communicate with the front suspension 20B and the rear suspension 22B for individually changing the suspension stiffness setting and/or the suspension stroke setting of the front suspension 20B and the rear suspension 22B.

Here, as seen in FIG. 3, the adjustable seatpost 26B is mounted to a seat tube of the front frame body FB2 in a conventional manner and supports the bicycle seat or saddle S2 in any suitable manner. The seatpost operating device 28B is configured to control the adjustable seatpost 26B to adjust the height of the saddle S2 relative the front frame body FB2. Preferably, the seatpost operating device 28B is preferably configured to be mounted to the handlebar H2 in a conventional manner. For example, the seatpost operating device 28B is mounted to the left side of the handlebar H2 adjacent to the suspension operating device 24B. The seatpost operating device 28B is configured to wirelessly communicate with the adjustable seatpost 26B for changing a height setting of the adjustable seatpost 26B.

Here, the second bicycle B2 further includes an electric power source 30B. Basically, in the illustrated embodiment, the electric power source 30B is electrically connected to the rear derailleur 12A, the remote control unit 14B and the drive unit 18B for supplying electrical power to them. Preferably, each of the bicycle components 16B, 20B, 22B, 24B, 26B, and 28B includes its own electric power source. Alternatively, the electric power source 30B can be further electrically connected to one or more of the other bicycle components BC (e.g., the bicycle components 16B, 20B, 22B, 24B, 26B, and 28B) as needed and/or desired. Here, the electric power source 30B is a battery pack that includes one or more batteries. As illustrated in FIG. 3, the electric power source 30B is located in the downtube of the front frame body FB2. Alternatively, the electric power source 30B can be attached an outer surface of the front frame body FB2. The electric power source 30B can also be disposed in other locations such as in the seat tube.

Figure 4:
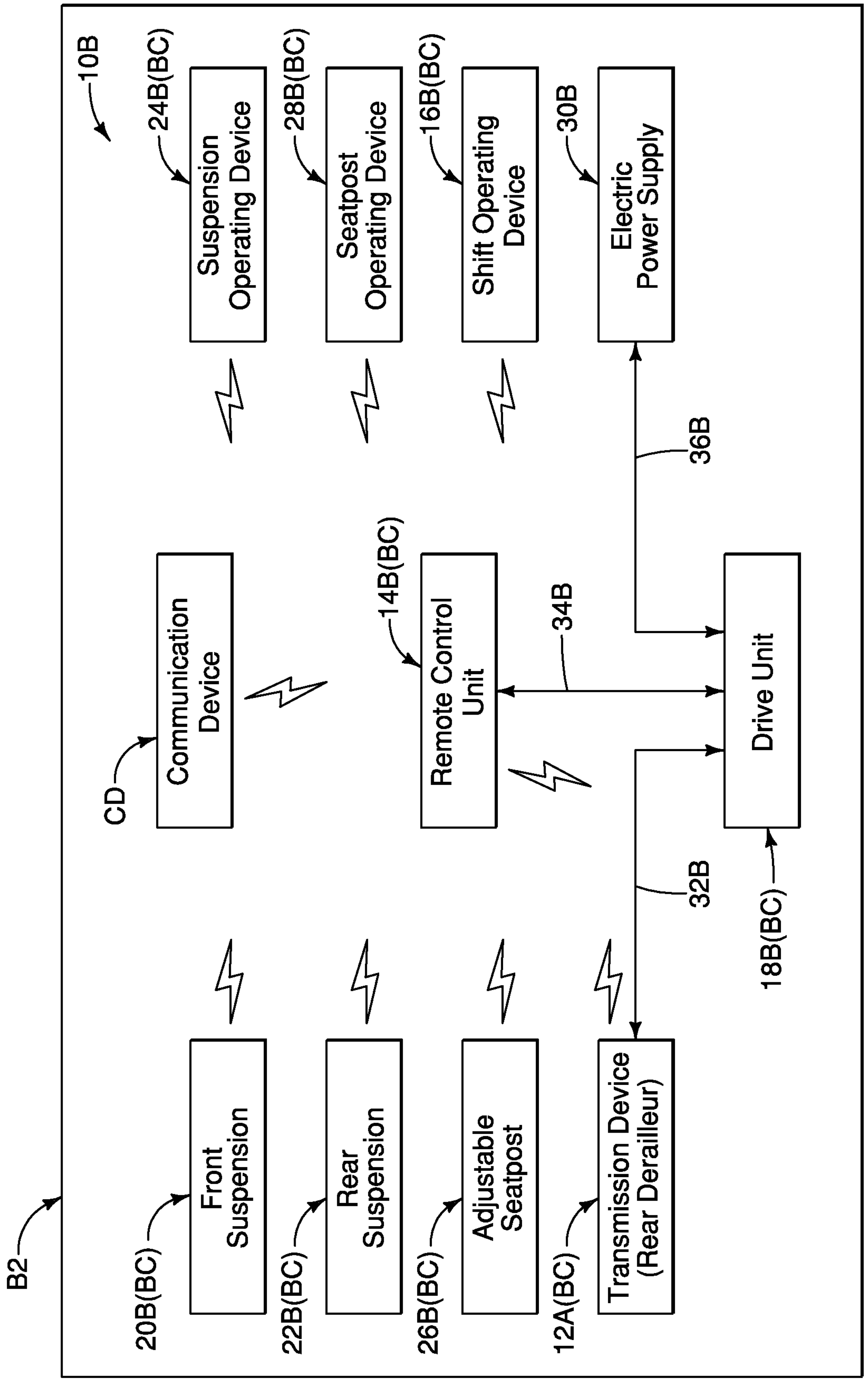
FIG. 4 is an overall schematic block diagram of a second bicycle system of the second bicycle illustrated in FIG. 2.

The electric power source 30B preferably includes one or more rechargeable batteries. The electric power source 30B is configured to supply electrical power to the rear derailleur 12A, the remote control unit 14B and the drive unit 18B. In particular, as seen in FIG. 4, the rear derailleur 12A is electrically connected to an electrical junction of the drive unit 18B by a first electrical cable 32B, and the remote control unit 14B is electrically connected to the electrical junction of the drive unit 18B by a second electrical cable 34B. The electrical junction of the drive unit 18B is then connected to the electric power source 30B by a third electrical cable 36B. In this way, electrical power from the electric power source 30B is supplied to the rear derailleur 12A, the remote control unit 14B and the drive unit 18B. Preferably, the first electrical cable 32B, the second electrical cable 34B and the third electrical cable 36B have pluggable electrical connectors provided at one or both ends for easy connection and disconnection.

Alternatively, the rear derailleur 12A can be directly connected to the electric power source 30B to receive the electrical power directly from the electric power source 30B. Likewise, alternatively, the remote control unit 14B can be directly connected to the electric power source 30B to receive the electrical power directly from the electric power source 30B. Also, alternatively, the remote control unit 14B can be directly connected to the rear derailleur 12A to receive the electrical power via the drive unit 18B and the rear derailleur 12A from the electric power source 30B.

Figure 5:
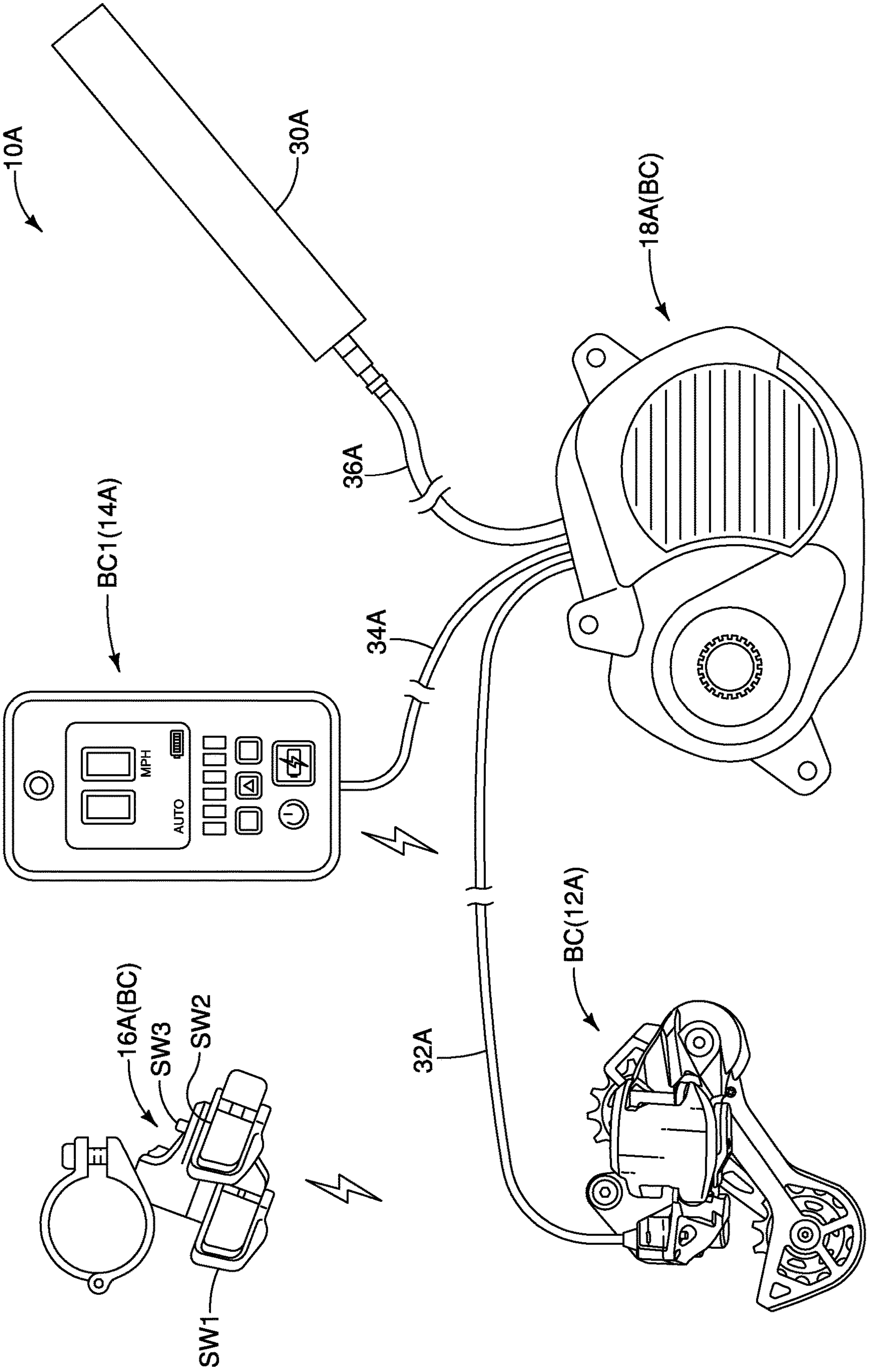
FIG. 5 is a simplified diagrammatic view of the first bicycle system including a rear derailleur, a remote control unit, an operating device, a drive unit, and a battery of the first bicycle illustrated in FIG. 1.
Figure 6:
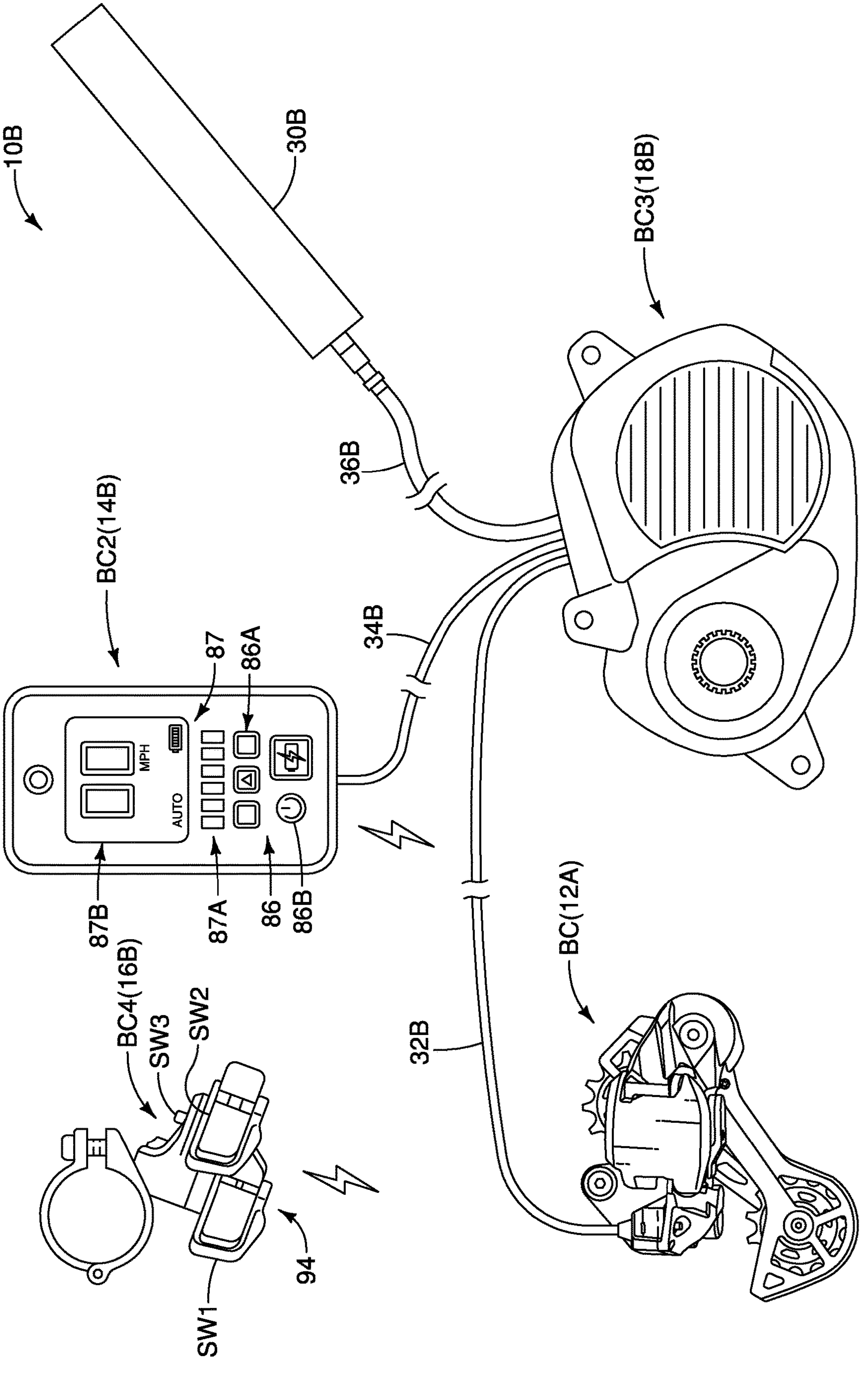
FIG. 6 is a simplified diagrammatic view of the second bicycle system including the rear derailleur of the first bicycle system, a remote control unit, an operating device, a drive unit, and a battery of the second bicycle illustrated in FIG. 2.
Figure 7:
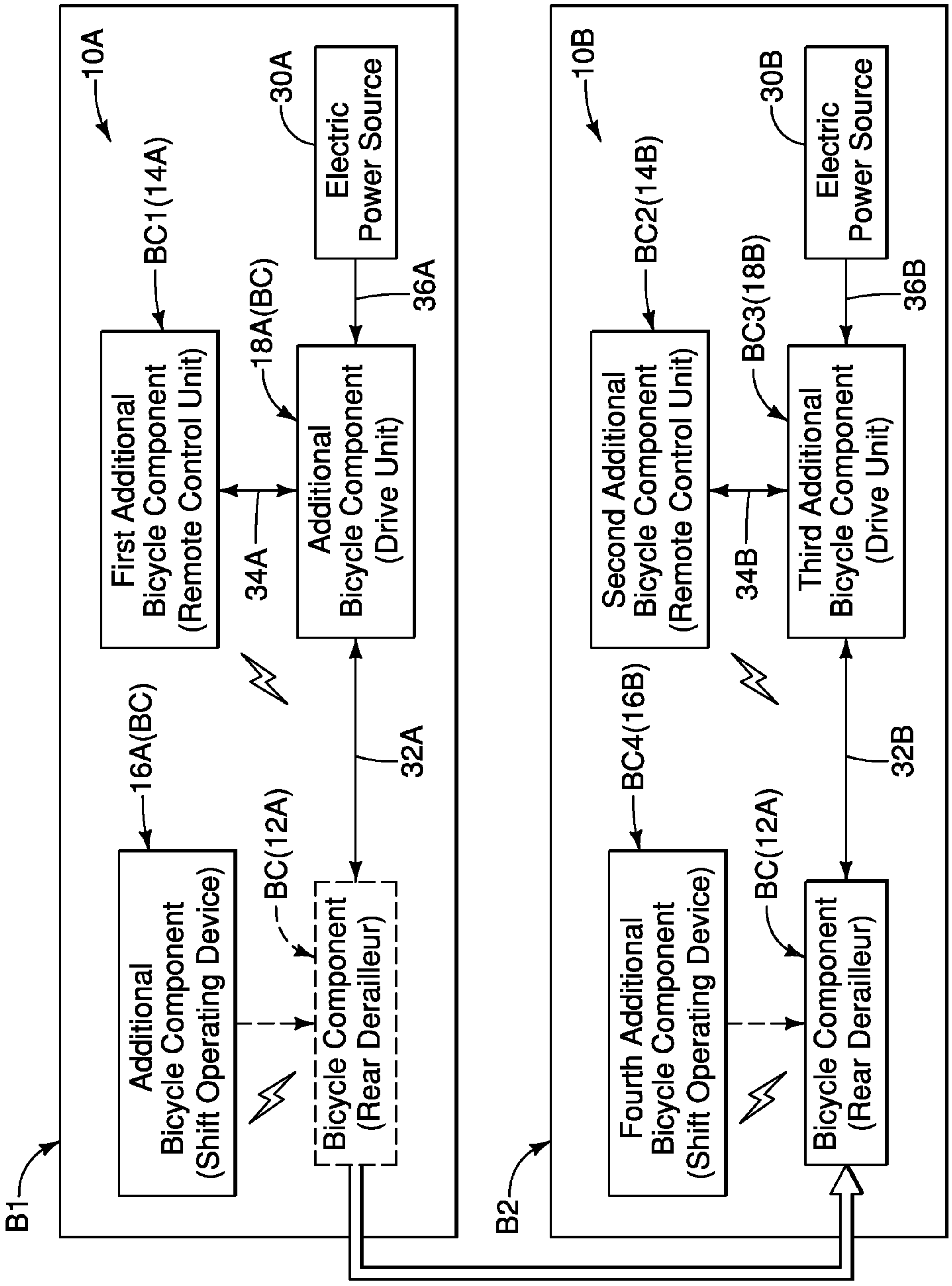
FIG. 7 is a simplified schematic block diagram illustrating the first bicycle system and the second bicycle system where the rear derailleur (i.e., the bicycle component) is being moved from the first bicycle to the second bicycle.

Referring now to FIGS. 5 to 7, the first bicycle system 10A and the second bicycle system 10B have been simplified for the sake of brevity to illustrate a scenario where a bicycle component BC is moved from the first bicycle system 10A to the second bicycle system 10B. When a bicycle component BC is moved from the first bicycle system 10A to the second bicycle system 10B, the bicycle component BC needs to be set up for wirelessly communicating with one or more additional components of the second bicycle system 10B. Also, according to the present disclosure a reset operation is performed on the bicycle component BC to clear the device identifications of the additional components of the first bicycle system 10A. In the illustrated example of FIGS. 5 to 7, the rear derailleur 12A is the bicycle component BC that is relocated from the first bicycle system 10A of the first bicycle B1 (FIG. 1) to the second bicycle system 10B of the second bicycle B2 (FIG. 3).

In the simplified configuration of the first bicycle system 10A shown in FIG. 5, the first bicycle system 10A includes the rear derailleur 12A, the remote control unit 14A, the shift operating device 16A, the drive unit 18A and the electric power source 30A. Here, in the simplified configuration of the first bicycle system 10A, the rear derailleur 12A is electrically connected to the drive unit 18A by the first electrical cable 32A, the remote control unit 14A is electrically connected to the drive unit 18A by the second electrical cable 34A, and the drive unit 18A is electrically connected to the electric power source 30A by the third electrical cable 36A. Also, in the simplified configuration of the first bicycle system 10A, the rear derailleur 12A is paired to the remote control unit 14A and the shift operating device 16A for wireless communication therebetween, and the remote control unit 14A is also paired to the drive unit 18A for wireless communication therebetween.

In the simplified configuration of the second bicycle system 10B shown in FIG. 6, the second bicycle system 10B includes the rear derailleur 12A of the first bicycle system 10A, the remote control unit 14B, the shift operating device 16B, the drive unit 18B and the electric power source 30B. Here, in the simplified configuration of the second bicycle system 10B, the rear derailleur 12A is electrically connected to the drive unit 18B by the first electrical cable 32B, the remote control unit 14B is electrically connected to the drive unit 18B by the second electrical cable 34B, and the drive unit 18B is electrically connected to the electric power source 30B by the third electrical cable 36B. Also, in the simplified configuration of the second bicycle system 10B, the rear derailleur 12A is paired to the remote control unit 14B and the shift operating device 16B for wireless communication therebetween, and the remote control unit 14B is also paired to the drive unit 18B for wireless communication therebetween. Also, as explained below, the remote control unit 14B and the drive unit 18B are configured to communicate with each other through wired communication without pairing. In this situation, the remote control unit 14B can functions as wireless communicator of the drive unit 18B. However, as explained below, a reset operation is performed on the rear derailleur 12A to clear the device identifications of the remote control unit 14A and the shift operating device 16A. Alternatively, the reset operation only clears the device identification of the remote control unit 14A from the rear derailleur 12A such that only pairing between the rear derailleur 12A and the remote control unit 14A is reset. On the other hand, the pairing between the rear derailleur 12A and the shift operating device 16A can be reset using other methods as needed and/or desired.

Referring to FIG. 7, the rear derailleur 12A is relocated from the first bicycle system 10A to the second bicycle system 10B. In the simplified configuration of the first bicycle system 10A, the rear derailleur 12A is simply referred to as the bicycle component BC, the remote control unit 14A is referred to as a first additional bicycle component BC1, and the remaining bicycle components are simply referred to as additional bicycle components BC. In the first bicycle system 10A, the bicycle component BC (12A) is configured to wirelessly communicate with the first additional bicycle component BC1 (14A) in a first pairing state where a first pairing between the bicycle component BC (12A) and the first additional bicycle component 14A is established. In other words, the first pairing state refers to a state in which the bicycle component BC (12A) is paired with the first additional bicycle component BC1 (14A) to establish wireless communications therebetween. The bicycle component BC (12A) is further configured to conduct wired communications with the first additional bicycle component BC1 (14A) via the first electrical cable 32A. More specifically, here, the bicycle component BC (12A) is further configured to conduct wired communications with the first additional bicycle component BC1 (14A) via the first electrical cable 32A and the second electrical cable 34A using power line communication (PLC). Alternatively, dedicated signal cables (i.e., a non-PLC cables) can be used to send control signals between the bicycle components BC as needed and/or desired. For example, the first electrical cable 32A, the second electrical cable 34A and the third electrical cable 36A can be used solely for providing electric power to the bicycle components BC. In such a case, a dedicated signal cable can be provided for wired communication between the bicycle components BC as needed and/or desired. For example, the first electrical cable 32A can be used solely for providing electric power to the bicycle component BC (12A). In such a case, the bicycle component BC (12A) wirelessly communicates with the first additional bicycle component BC1 (14A).

In the simplified configuration of the second bicycle system 10B, the rear derailleur 12A is still referred to as the bicycle component BC, the remote control unit 14B is referred to as a second additional bicycle component BC2, the drive unit 18B is referred to as a third additional bicycle component BC3, and the shift operating device 16B is referred to as a fourth additional bicycle component BC4. Here, in the second bicycle system 10B, the bicycle component BC (12A) is configured to wirelessly communicate with the second additional bicycle component BC2 (14B) in a second pairing state where a second pairing between the bicycle component BC (12A) and the second additional bicycle component BC2 (14B) is established. In other words, the second pairing state refers to a state in which the bicycle component BC (12A) is paired with the second additional bicycle component BC2 (14B) to establish wireless communications therebetween. The bicycle component BC (12A) is further configured to conduct wired communications with the second additional bicycle component BC2 (14B) via the first electrical cable 32B. More specifically, here, the bicycle component BC (12A) is further configured to conduct wired communications with the second additional bicycle component BC2 (14B) via the first electrical cable 32B and the second electrical cable 34B using power line communication (PLC).

Moreover, the bicycle component BC (12A) is configured to wirelessly communicate with the third additional bicycle component BC3 (18B) in a third pairing state where a third pairing between the bicycle component BC (12A) and the third additional bicycle component BC3 (18B) is established. In other words, the third pairing state refers to a state in which the bicycle component BC (12A) is paired with the third additional bicycle component BC3 (18B) to establish wireless communications therebetween. The bicycle component BC (12A) is further configured to conduct wired communications with the third additional bicycle component BC3 (18B) via the first electrical cable 32B using power line communication (PLC). Alternatively, the bicycle component BC (12A) does not communicate with the third additional bicycle component BC3 (18B). In other words, in an alternate configuration, the bicycle component BC (12A) is not paired with the third additional bicycle component BC3 (18B) and no wired communication is provided between the bicycle component BC (12A) and the third additional bicycle component BC3 (18B). Thus, in this alternate configuration, the bicycle component BC (12A) does not communicate with the third additional bicycle component BC3 (18B) using either wired communication or wireless communication.

Moreover, the bicycle component BC (12A) is configured to wirelessly communicate with the fourth additional bicycle component BC4 (16B) in a fourth pairing state where a fourth pairing between the bicycle component BC (12A) and the fourth additional bicycle component BC4 (16B) is established. In other words, the fourth pairing state refers to a state in which the bicycle component BC (12A) is paired with the fourth additional bicycle component BC4 (16B) to establish wireless communications therebetween. The second additional bicycle component BC2 (14B) is configured to communicate with the third additional bicycle component BC3 (18B). More specifically, here, the second additional bicycle component BC2 (14B) is configured to selectively communicate with the third additional bicycle component BC3 (18B) using either wireless communication or wired communication. Alternatively, the second additional bicycle component BC2 (14B) can be configured to communicate with the third additional bicycle component BC3 (18B) using only wired communication.

Basically, the bicycle component BC (12A) is configured to communicate with the first additional bicycle component BC1 (14B) as well as other additional bicycle components in the case where the bicycle component BC (12A) is installed on the first bicycle B1. In the case where the bicycle component BC (12A) is installed on the second bicycle B2, the second additional bicycle component BC2 (14B) is configured to send control signal to the bicycle component BC (12A). In particular, the second additional bicycle component BC2 (14B) is configured to send a shift signal as the control signal to the bicycle component BC (12A). The control signal (shift signal) can be based on information from the third additional bicycle component BC3 (18B). Moreover, the second additional bicycle component BC2 (14B) can send other control signal as needed and/or desired. For example, the second additional bicycle component BC2 (14B) can communicate with the bicycle component BC (12A) to switch operating modes of the bicycle component BC (12A) between a manual mode and an automatic mode. Also, the bicycle component BC (12A) is configured to communicate with the third additional bicycle component BC3 (18B) and the fourth additional bicycle component BC4 (16B) in the case where the bicycle component BC (12A) is installed on the second bicycle B2.

Figure 8:
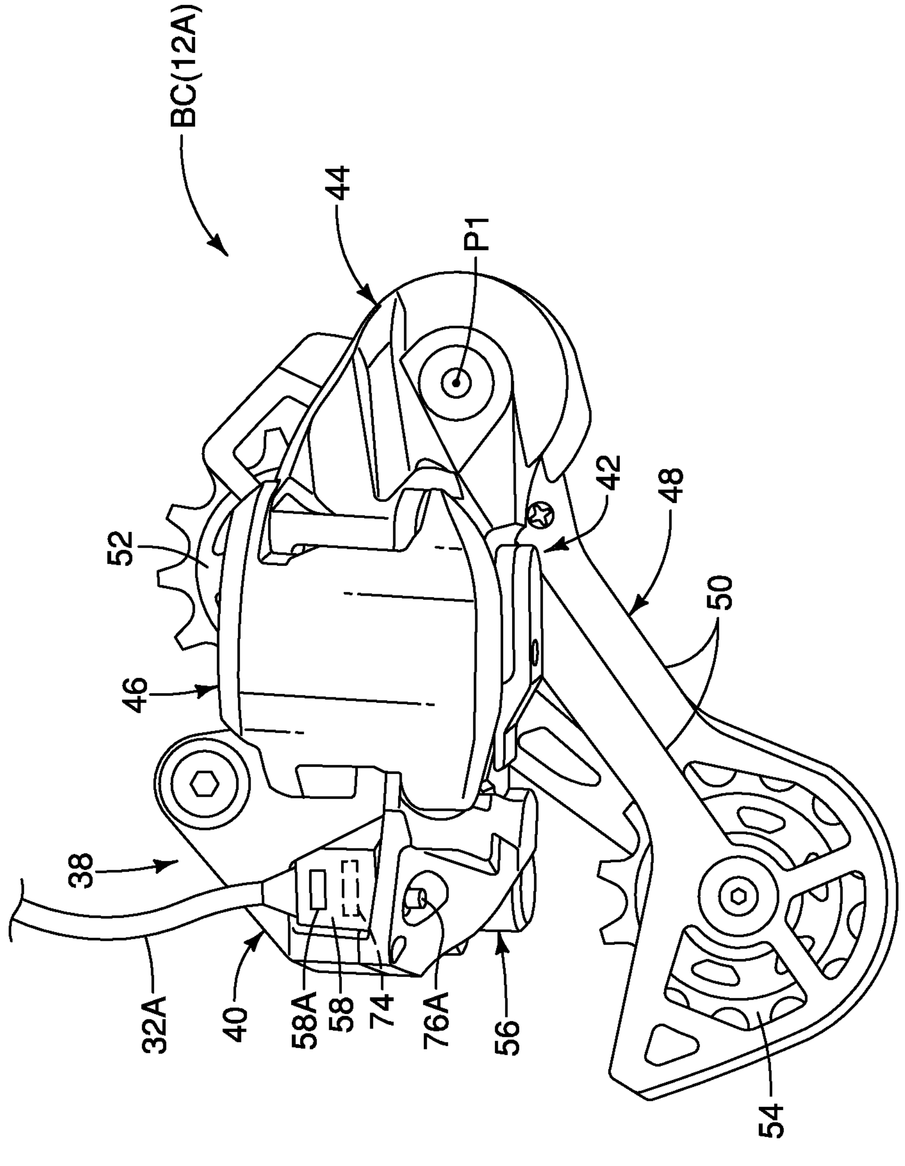
FIG. 8 is a side elevational view of the rear derailleur (i.e., the bicycle component) illustrated in FIGS. 1, 3, 5 and 6.

Referring now to FIG. 8, the basic mechanical structure of the bicycle component BC (12A) used in the first bicycle system 10A and the second bicycle system 10B will now be discussed. Although the bicycle component BC is a rear derailleur (i.e., a transmission device), the bicycle component BC can be a different type of bicycle component as needed and/or desired. Here, as seen in FIG. 8, the bicycle component BC (12A) comprises a component body 38. The component body 38 includes a base member 40 and a movable mechanism 42. The movable mechanism 42 is configured to move with respect to the base member 40. Here, in the case where the bicycle component BC is a derailleur, the movable mechanism 42 includes a movable member 44 and a linkage structure 46. The linkage structure 46 is configured to movably connect the movable member 44 relative to the base member 40. The base member 40 is configured to be mounted to a bicycle frame. For example, here, the base member 40 is detachably mounted to the rear frame body RB1 or RB2 in a conventional manner such as a fixing bolt. The linkage structure 46 movably connects the movable member 44 to the base member 40. In this way, the movable member 44 can be moved in a lateral direction of the first bicycle B1 or the second bicycle B2 relative to the base member 40.

Here, in the case where the bicycle component BC is a derailleur, the bicycle component BC (12A) further comprises a chain guide 48. The chain guide 48 is configured to pivotally coupled to the movable member 44 about a pivot axis P1. The chain guide 48 is configured to move the chain CN1 or CN2 between a plurality of sprockets SP1 or SP2 of a sprocket assembly for changing the shift (gear) stage. The chain guide 48 is configured to contact the chain CN1 or CN2 to shift the chain CN1 or CN2 between the rear sprockets SP1 or SP2 as the movable member 44 moves in the lateral direction of the first bicycle B1 or the second bicycle B2 relative to the base member 40. Preferably, as seen in FIG. 8, the chain guide 48 basically includes a pair of chain cage plates 50, a guide pulley 52 and a tension pulley 54. The guide pulley 52 and the tension pulley 54 are both rotatably disposed between the chain cage plates 50. Since rear derailleurs are well known in the bicycle field, conventional structures of the bicycle component BC (12A) will only be discussed to the extent needed to understand the first bicycle system 10A and the second bicycle system 10B.

Here, as seen in FIG. 8, the bicycle component BC (12A) further comprises an actuator 56 that is provided to one of the base member 40, the linkage structure 46 and the linkage structure 46. In the illustrated embodiment, the actuator 56 is provided to the base member 40. However, the actuator 56 can be provided to either the linkage structure 46 or the linkage structure 46 as needed and/or desired. In any case, the actuator 56 is operatively coupled to the linkage structure 46. In other words, the actuator 56 is operatively coupled to the linkage structure 46 to move the linkage structure 46 with respect to the base member 40 in response to a shift command. Here, the actuator 56 is an electric motor. Thus, in the illustrated embodiment, the bicycle component BC (12A) constitutes an electric rear derailleur. Preferably, the actuator 56 is a reversible electric motor. Here, when the bicycle component BC (12A) is installed on the first bicycle B1, the actuator 56 is controlled in response to either a user input to the shift operating device 16A when in manual shifting mode or a shift signal produced by the remote control unit 14B when in automatic shifting mode. When the bicycle component BC (12A) is installed on the second bicycle B2, the actuator 56 is controlled in response to either a user input to the fourth additional bicycle component BC4 (16B) when in manual shifting mode or a shift signal produced by the second additional bicycle component BC2 (14B) when in automatic shifting mode.

As seen in FIG. 8, the bicycle component BC (12A) further comprises a housing 58. The housing 58 is provided to one of the base member 40, the linkage structure 46 and the linkage structure 46. In the illustrated embodiment, the housing 58 is provided to the base member 40. The housing 58 is configured to contain various electric parts of the bicycle component BC (12A) as stated below.

Figure 9:
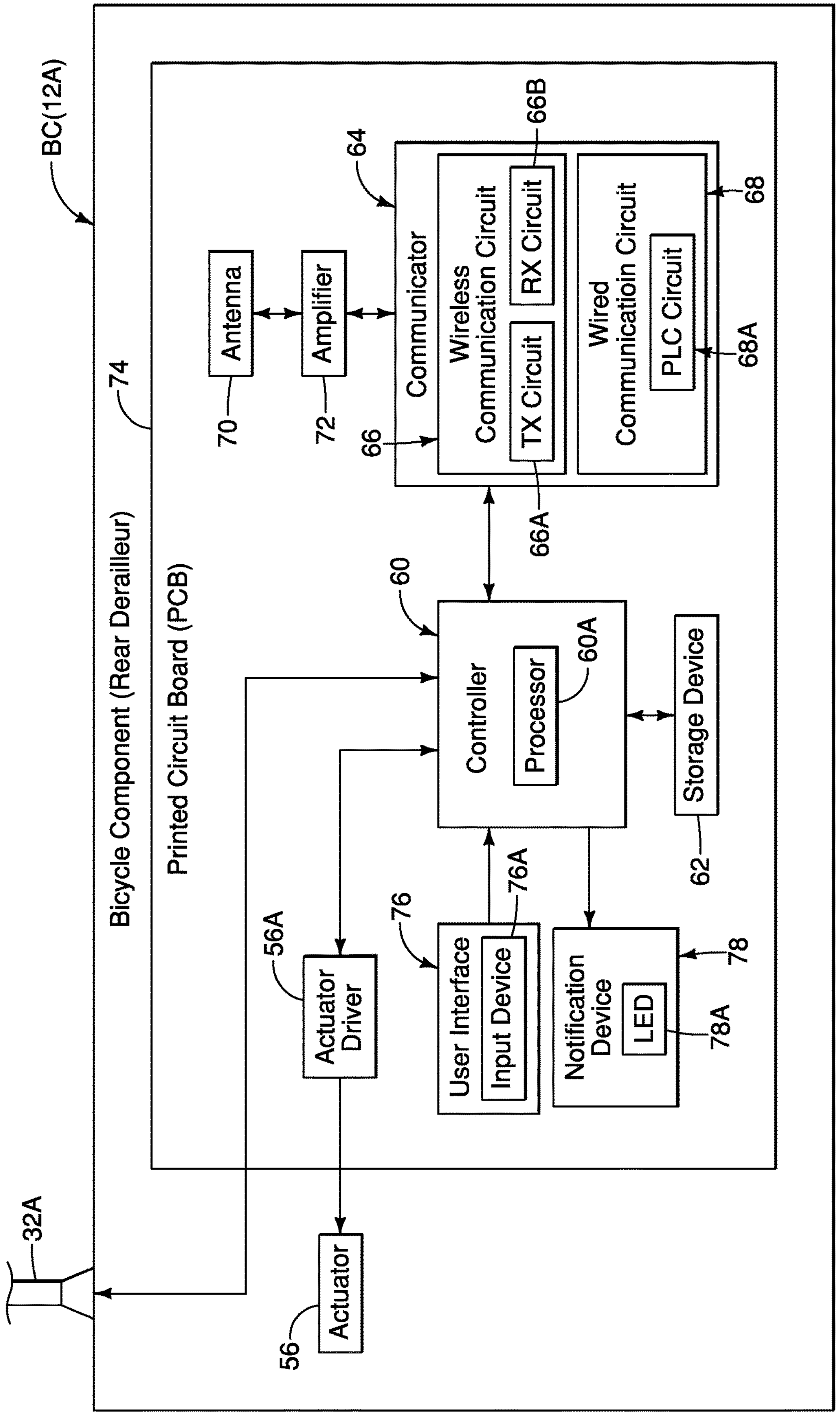
FIG. 9 is a schematic block diagram illustrating various electrical parts of a bicycle component (e.g., the rear derailleur).

Referring now to FIG. 9, a schematic block diagram of the electrical configuration of the bicycle component BC (12A) is illustrated. The electrical configuration shown in FIG. 9 is not limited to the rear derailleur 12A. Rather, for example, the other bicycle components 20A, 20B, 22A, 26*a* and 26B also include this same configuration illustrated in FIG. 9. In other words, the follow description of the electrical configuration of the the bicycle component 12A (the rear derailleur) also applies to the bicycle components 20A, 20B, 22A, 26A and 26B.

As seen in FIG. 9, the bicycle component BC (12A) comprises a controller 60. The controller 60 is configured to control the actuator 56 for moving the chain guide 48 to shift the chain CN1 or CN2 between the rear sprockets SP1 or SP2 in a conventional manner. The actuator 56 can be controlled by control signals from either the second additional bicycle component BC2 (14B) or the fourth additional bicycle component BC4 (16B). The second additional bicycle component BC2 (14B) can be used for adjusting the setting of the bicycle component BC (12A), while the fourth additional bicycle component BC4 (16B) can be used for actuating the actuator 56 to perform a shift operation. Thus, the controller 60 is further configured to receive a control signal from the fourth additional bicycle component BC4 (16B) that is different from the second additional bicycle component BC2 (14B).

Basically, the controller 60 is an electronic controller that includes at least one processor 60A that is configured to execute predetermined control program (e.g., a pairing program, a resetting program, a shifting program, etc). The processor 60A includes, for example, a central processing unit (CPU) or a micro processing unit (MPU). Thus, the terms "controller" and "electronic controller" as used herein refer to hardware that executes a software program, and does not include a human being. When the bicycle component BC (12A) is mounted to the first bicycle B1, the controller 60 is electrically connected to the electric power source 30A that is remote from the bicycle component BC (12A). When the bicycle component BC (12A) is mounted to the second bicycle B2, the controller 60 is electrically connected to the electric power source 30B that is remote from the bicycle component BC (12A). Thus, the controller 60 is powered by electric power supplied from the electric power source 30A or 30A or from an electric power source provided on the component body 38 of the bicycle component BC (12A).

The bicycle component BC (12A) further comprises a storage device 62. Here, for example, the storage device 62 includes, for example, at least one of a read-only memory (ROM), an erasable programmable read only memory (EPROM), an electrically erasable programmable read-only memory (EEPROM), and a flash memory. The storage device 62 stores various control processes or control programs as well as information or data used by the controller 60. Thus, the storage device 62 is electrically connected to the controller 60. In this way, the controller 60 can retrieve data and access programs stored in the storage device 62, and can store data to the storage device 62. As explained below, the storage device 62 preferably includes non-volatile memory. The storage device 62 is configured to store various control programs (e.g., a pairing program, a resetting program, a shifting program, etc), operational data, component identification data, device identifications of other bicycle components. Thus, the storage device 62 is configured to store the device identifications for pairing with other bicycle components BC. For example, the storage device 62 is configured to store a first device identification ID1 that identifies the first additional bicycle component BC1 (14A) as a source of a wireless signal as coming from the first additional bicycle component BC1 (14A). The first device identification ID1 is stored in the storage device 62 when the first additional bicycle component BC1 (14A) is in the first pairing state where the first pairing between the bicycle component BC (12A) and the first additional bicycle component BC1 (14A) is established. In this situation, the bicycle component BC (12A) and the first additional bicycle component BC1 (14A) can directly communicate using wireless communication. A second device identification ID2 is stored in the storage device 62 when the second additional bicycle component BC2 (14B) is in the second pairing state where the second pairing between the bicycle component BC (12A) and the second additional bicycle component BC2 (14B) is established. The second device identification ID2 identifies the second additional bicycle component BC2 (14B) as a source of a wireless signal as coming from the second additional bicycle component BC2 (14B). In this situation, the bicycle component BC (12A) and the second additional bicycle component BC2 (14B) can directly communicate using wireless communication. A third device identification ID3 is stored in the storage device 62 when the third additional bicycle component BC3 (18B) is in the third pairing state where the third pairing between the bicycle component BC (12A) and the third additional bicycle component BC3 (18B) is established. The third device identification ID3 identifies the third additional bicycle component BC3 (18B) as a source of a wireless signal as coming from the third additional bicycle component BC3 (18B). In this situation, the bicycle component BC (12A) and the third additional bicycle component BC3 (18B) can directly communicate using wireless communication. A fourth device identification ID4 is stored in the storage device 62 when the fourth additional bicycle component BC4 (16B) is in the fourth pairing state where the fourth pairing between the bicycle component BC (12A) and the fourth additional bicycle component BC4 (16B) is established. The fourth device identification ID4 identifies the fourth additional bicycle component BC4 (16B) as a source of a wireless signal as coming from the fourth additional bicycle component BC4 (16B). In this situation, the bicycle component BC (12A) and the fourth additional bicycle component BC4 (16B) can directly communicate using wireless communication. However, the bicycle component BC (12A) can also indirectly communication with one or more of the bicycle components BC. Alternatively, for example, the first pairing can be established by storing the device identification of the drive unit 18A, and the second pairing can be established by storing the device identification of the third additional bicycle component BC3 (the drive unit 18B). In other words, in the first pairing, the first additional bicycle component BC1 (14A) can wirelessly communicate with the bicycle component BC (12A) by using the device identification of the drive unit 18A. On the other hand, in the second pairing, the second additional bicycle component BC2 (14B) can wirelessly communicate with the bicycle component BC (12A) by using the device identification of the third additional bicycle component BC3 (the drive unit 18B).

The bicycle component BC (12A) further comprises a communicator 64 for communicating with the additional bicycle components. The term "communicator" as used herein refers to hardware that transmits signals, and does not include a human being. The term "communicator" includes a receiver, a transmitter, a transceiver, a transmitter-receiver, and contemplates any device or devices, separate or combined, capable of transmitting and/or receiving communication signals, including shift signals or control, command or other signals related to some function of the component being controlled. Specifically, the bicycle component BC (12A) comprises a wireless communication circuit 66. Using the wireless communication circuit 66, the bicycle component BC (12A) can wirelessly communicate with additional bicycle component(s) BC once paired with the additional bicycle component(s) BC. Moreover, optionally, the bicycle component BC (12A) further comprises a wired communication circuit 68. Alternatively, the wired communication circuit 68 can be omitted if needed and/or desired. Using the wired communication circuit 68, the bicycle component BC (12A) can communication via the first electrical cable 32A or 32B with additional bicycle component(s) BC using power line communication (PLC). Thus, the communicator 64 comprises the wireless communication circuit 66 and the wired communication circuit 68. The controller 60 is electrically connected to the wireless communication circuit 66. Also, the controller 60 is electrically connected to the wired communication circuit 68. Thus, the controller 60 is configured to receive data signals from the communicator 64 and output data signals to the communicator 64. The communicator 64 can have its own controller and its own storage device as needed and/or desired. For example, the controller 60 can be a master controller and the controller of the communicator 64 can be a slave controller.

Here, the wireless communication circuit 66 is configured to both receive and transmit wireless communication signals. In particular, the wireless communication circuit 66 includes a signal transmitting circuit 66A (TX circuit) and a signal receiving circuit 66B (RX circuit). The signal transmitting circuit 66A can also be referred to as a wireless transmitter 66A. The receiving circuit 66B can also be referred to as a wireless receiver 66B. The wireless communication signals can be radio frequency (RF) signals, ultra-wide band communication signals, radio frequency identification (RFID), ANT+ communications, or Bluetooth® communications, BLE communications an original wireless communication standard, or any other type of signal suitable for short range wireless communications as understood in the bicycle field. Preferably, the wireless communication circuit 66 is configured to wirelessly communicate with the additional bicycle components using a BLE communication protocol. For example, the wireless communication circuit 66 is configured to wirelessly communicate with the first additional bicycle component BC1 (14B) in the first pairing state where the first pairing between the bicycle component BC (12A) and the first additional bicycle component BC1 (14B) is established. Also, for example, the wireless communication circuit 66 is configured to wirelessly communicate with the second additional bicycle component BC2 (14B) in the second pairing state where the second pairing between the bicycle component BC (12A) and the second additional bicycle component BC2 (14B) is established. In addition, for example, the wireless communication circuit 66 is configured to wirelessly communicate with the third additional bicycle component BC3 (18B) in the third pairing state where the third pairing between the bicycle component BC (12A) and the third additional bicycle component BC3 (18B) is established. Moreover, for example, the wireless communication circuit 66 is configured to wirelessly communicate with the fourth additional bicycle component BC4 (16B) in the fourth pairing state where the fourth pairing between the bicycle component BC (12A) and the fourth additional bicycle component BC4 (16B) is established.

The bicycle component BC further comprises an antenna 70 coupled to the communicator 64. The antenna 70 is configured to receive and transmit wireless signals from the communicator 64. Here, the bicycle component BC further comprises a signal amplifier 72 coupled to the communicator 64. The signal amplifier 72 is provided for selectively amplifying the signals of the antenna 70. The signal amplifier 72 can be controlled by the controller 60 or a slave controller of the communicator 64. The controller 60 is configured to control the signal amplifier 72 such that the signal amplifier 72 operates in a first power consumption state in a state where the bicycle component BC is in a wireless signal listening mode. The controller 60 is configured to control the signal amplifier 72 such that the signal amplifier 72 operates in a second power consumption state in a state where the bicycle component BC is in a pairing mode. The first power consumption state has a lower power consumption than the second power consumption state. For example, the signal amplifier 72 operates intermittently, sleeps or turns off in the first power consumption state where the bicycle component BC is in the wireless signal listening mode. In this way, the communicator 64 is less likely incorrectly paired by reducing the signal strength where the bicycle component BC is in the pairing mode. On the other hand, in all other modes, the signal amplifier 72 is operated at full strength to ensure receiving a control signal.

Here, the wired communication circuit 68 is configured to both receive and transmit communication signals. In particular, the wired communication circuit 68 includes a power line communication circuit 68A that is configured to perform two-way wired communications via the first electrical cable 32B. Alternatively, the wired communication circuit 68 can be omitted if needed and/or desired. In the illustrated embodiment, for example, the wired communication circuit 68 is configured to be electrically connected to the second additional bicycle component BC2 (14B) via the first electrical cable 32B. In particular, as seen in FIG. 7, the wired communication circuit 68 is electrically connected to the second additional bicycle component BC2 (14B) via the first electrical cable 32B and the second electrical cable 34B. Alternatively, the first electrical cable 32B can directly connect the the wired communication circuit 68 is electrically connected to the second additional bicycle component BC2 (14B) if needed and/or desired. In the illustrated configuration, the wired communication circuit 68 can communicate with the second additional bicycle component BC2 (14B) and the third additional bicycle component BC3 (18B) via the first electrical cable 32B using a wired communication protocol such as power line communication (PLC). The second additional bicycle component BC2 (14B) is configured to be electrically connected to the third additional bicycle component BC3 (18B) via the second electrical cable 34B. Thus, the second additional bicycle component BC2 (14B) can communicate with the third additional bicycle component BC3 (18B) via the second electrical cable 34B using a wired communication protocol such as power line communication (PLC). As mentioned above, the electric power source 30B is electrically connected to the third additional bicycle component BC3 (18B). In this way, the electric power source 30B supplies electric power to the bicycle component BC (12A), the second additional bicycle component BC2 (14B) and the third additional bicycle component BC3 (18B). Alternatively, dedicated signal cables (i.e., a non-PLC cables) can be used to send control signals between the bicycle components BC as needed and/or desired.

Here, as illustrated in FIG. 9, the bicycle component BC (12A) further comprises a circuit board 74. The circuit board 74 is, for example, a printed circuit board (PCB). The circuit board 74 supports and electrically connects the various electrical parts of the bicycle component BC (12A). The housing 58 accommodates the circuit board 74. In this way, the circuit board 74 is provided to the base member 40 of the bicycle component BC (12A) in the illustrated embodiment.

As illustrated in FIG. 9, the illustrated embodiment, the circuit board 74 supports and electrically connects the controller 60, the storage device 62, the communicator 64 the antenna 70, and the signal amplifier 72. While the controller 60, the storage device 62, the communicator 64, the antenna 70, and the signal amplifier 72 are all provided on the circuit board 74, it will be apparent from this disclosure that the bicycle component BC (12A) can have a plurality of circuit boards. For example, the controller 60 can be provided on a first circuit board, the storage device 62 can be provided on a second circuit board, and the communicator 64, the antenna 70, and the signal amplifier 72 can be provided on a third circuit board.

Referring to FIGS. 8 and 9, the bicycle component BC (12A) further comprises a user interface 76. Here, the component body 42 is provided with the user interface 76. In particular, at least one of the base member 40 and the movable mechanism 42 is provided with the user interface 76. In the illustrated embodiment, the user interface 76 is provided to the housing 58. The user interface 76 is configured to accept a user input. Preferably, the user interface 76 is exposed on an exterior of the housing 58. In this way, a user input can be easily inputted to the user interface 76. Here, the user interface 76 includes an input device 76A in the form of a button. As seen in FIG. 8, the input device 76A is accessible on the exterior of the housing 58 such that a user can depress the input device 76A. While the input device 76A is illustrated as a single button, the input device 76A can include two or more buttons, or other types of inputs as needed and/or desired.

Preferably, at least one of the user interface 76 and the controller 60 is provided to the circuit board 74. As illustrated in FIG. 9, in the illustrated embodiment, the user interface 76 and the controller 60 are provided to the circuit board 74. Alternatively, the user interface 76 and the controller 60 can be provided on different circuit boards as needed and/or desired. In any case, the controller 60 is electrically connected to the user interface 76. In this way, the user input to the user interface 76 is received by the controller 60 to process the user input in accordance with the operation of the input device 76A. For example, the controller 60 is configured to perform different operations depending how many times the input device 76A is operated in a predetermined period of time, and/or how long the input device 76A is operated. Here, the user interface 76 can be used to perform, among other operations, a pair operation and a reset operation. To put the bicycle component BC (12A) in a pairing mode, the button of the input device 76A is depressed and held for one-half of a second to two seconds. On the other hand, to put the bicycle component BC (12A) in an adjustment mode, the button of the input device 76A is depressed and held for second seconds to five seconds. Finally, to put the bicycle component BC (12A) in a resetting mode, the button of the input device 76A is depressed and held for eight seconds to fifteen seconds. Thus, the controller 60 is configured to perform a pair operation, an adjustment operation and a reset operation in response to a user input in accordance with the operation of the input device 76A.

Referring to FIG. 9, the bicycle component BC (12A) further comprises a notification device 78. The notification device 78 is configured to be controlled by the controller 60. The controller 60 is configured to control the notification device 78 to produce a notification in response to the user input being provided to the user interface 76. Here, in the illustrated embodiment, the notification device 78 includes a light emitting device 78A. For example, the light emitting device 78A includes one or more light emitting diodes (LEDs). Here, the light emitting device 78A includes a red LED, a blue LED and a green LED that can be selectively illuminated by the controller 60 to produce different colors of light. In other words, the controller 60 controls the notification device 60 to selectively illuminate the LEDs of the notification device 78 to produce a notification (e.g., a solid continuous light or a flashing light of a predetermined color) to indicate a particular situation is occurring or has been completed.

Preferably, the notification device 78 is provided to the housing 58. For example, the notification device 78 is provided to the circuit board 74 in the illustrated embodiment. However, the notification device 78 can be provided on a separate circuit board if needed and/or desired. The notification device 78 is preferably configured so that the light produced by the LEDs of the notification device 78 is visible through a transparent window portion 58*a* of the housing 58 as seen in FIG. 8. As mentioned above, to put the bicycle component BC (12A) in the pairing mode, the button of the input device 76A is depressed and held for one-half of a second to two seconds. Upon entering the pairing mode, the controller 60 controls the notification device 78 such that light emitting device 78A produces a blue light visible through the window portion 58*a* of the housing 58 indicating that the bicycle component BC (12A) is in the pairing mode. On the other hand, as mentioned above, to put the bicycle component BC (12A) in the adjustment mode, the button of the input device 76A is depressed and held for two seconds to five seconds. Upon entering the pairing mode, the controller 60 controls the notification device 78 such that light emitting device 78A produces a yellow light visible through the window portion 58*a* of the housing 58 indicating that the bicycle component BC (12A) is in the adjustment mode. Finally, as mentioned above, to put the bicycle component BC (12A) in a resetting mode, the button of the input device 76A is depressed and held for eight seconds to fifteen seconds. Upon entering the resetting mode, the controller 60 controls the notification device 78 such that light emitting device 78A produces an alternating pattern of a green light and a red light that is visible through the window portion 58*a* of the housing 58 indicating that the bicycle component BC (12A) is in the resetting mode.

Figure 10:
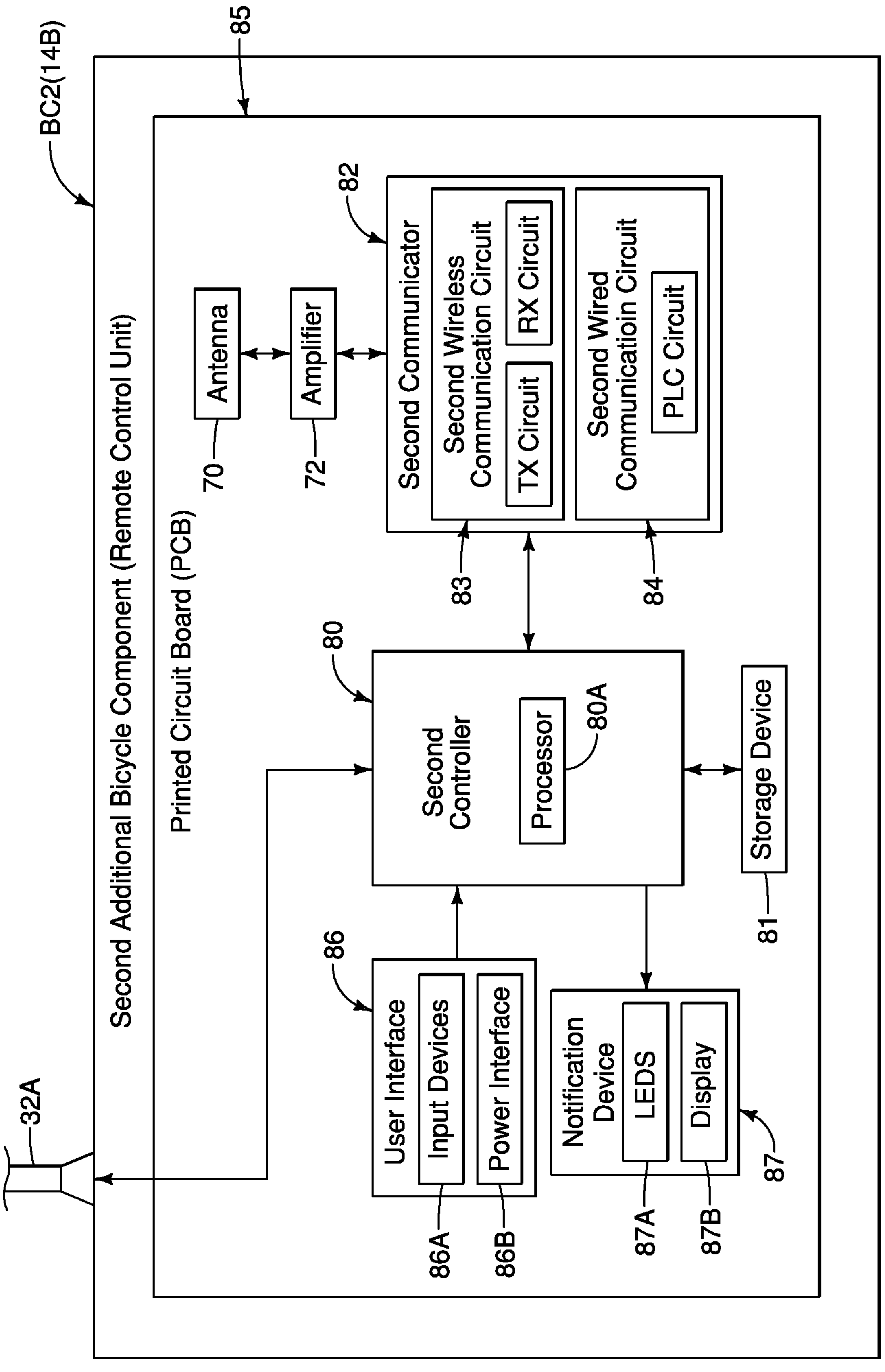
FIG. 10 is a schematic block diagram illustrating various electrical parts of a second additional bicycle component (e.g., the remote control unit).

Referring now to FIG. 10, the second additional bicycle component BC2 (14B) will now be discussed in more detail. The remote control unit 14A preferably has the same configuration as the second additional bicycle component BC2 (14B). Thus, the following description of the second additional bicycle component BC2 (14B) applies the remote control unit 14A. Basically, the second additional bicycle component BC2 (14B) is configured to communicate with at least the bicycle component BC (12A) and the third additional bicycle component BC3 (18B). Preferably, the second additional bicycle component BC2 (14B) also communicates with various sensors provided on the bicycle B2 via wireless communication and/or wired communication. In this way, the second additional bicycle component BC2 (14B) is configured to control the electric power source 30B, control the assist level of the third additional bicycle component BC3 (18B), and receiving data for displaying the data (e.g., a riding speed, a cadence, a riding distance, a gear speed, an assist mode, etc.).

Moreover, the second additional bicycle component BC2 (14B) is configured to at least partly control the bicycle component BC (12A) and the third additional bicycle component BC3 (18B). For example, in the second additional bicycle component BC2 (14B) can be used to turn on and turn off the bicycle component BC (12A). Moreover, for example, the second additional bicycle component BC2 (14B) can control the actuator 56 of the bicycle component BC (12A) to perform automatic shifting based on detection results of the various sensors indicating various operating conditions of the bicycle B2. In the case of the third additional bicycle component BC3 (18B), for example, the second additional bicycle component BC2 (14B) can control the third additional bicycle component BC3 (18B) to change the assist operating mode of the third additional bicycle component BC3 (18B). Thus, the second additional bicycle component BC2 (14B) is configured to operate the third additional bicycle component BC3 (18B) differently from the bicycle component BC (12A).

Here, as seen in FIG. 10, the second additional bicycle component BC2 (14B) comprises a second controller 80. Basically, the controller 80 is an electronic controller that includes at least one processor 80A that is configured to execute predetermined control program (e.g., a pairing program, a resetting program, a shifting program, etc). The processor 80A includes, for example, a central processing unit (CPU) or a micro processing unit (MPU). The second controller 80 is electrically connected to the electric power source 30B remote from the second additional bicycle component BC2 (14B).

The the second additional bicycle component BC2 (14B) further comprises a storage device 81. Here, for example, the storage device 81 includes, for example, at least one of a read-only memory (ROM), an erasable programmable read only memory (EPROM), an electrically erasable programmable read-only memory (EEPROM), and a flash memory. The storage device 81 stores various control processes or control programs as well as information or data used by the second controller 80. Thus, the storage device 81 is electrically connected to the second controller 80. In this way, the second controller 80 can retrieve data and access programs stored in the storage device 81, and can store data to the storage device 81. The storage device 81 preferably includes non-volatile memory. The storage device 81 is configured to store various control programs (e.g., a pairing program, a resetting program, a shifting program, etc), operational data, component identification data, device identifications of other bicycle components. For example, the storage device 81 is configured to store a device identification ID0 that identifies the bicycle component BC (12A) as a source of a wireless signal as coming from the bicycle component BC (12A). The device identification ID0 is stored in the storage device 81 when the bicycle component BC (12A) is in the second pairing state where the second pairing between the bicycle component BC (12A) and the second additional bicycle component BC2 (14B) is established. The third device identification ID3 is also stored in the storage device 81 so that the second additional bicycle component BC2 (14B) and the third additional bicycle component BC3 (18B) can wirelessly communicate.

The second additional bicycle component BC2 (14B) further comprises a second communicator 82 for communicating with the bicycle component BC (12A) and the third additional bicycle component BC3 (18B). Specifically, the second additional bicycle component BC2 (14B) comprises a second wireless communication circuit 83. Using the second wireless communication circuit 83, the second additional bicycle component BC2 (14B) can wirelessly communicate with the bicycle component BC (12A) and the third additional bicycle component BC3 (18B). The second wireless communication circuit 83 is configured to wirelessly communicate with the bicycle component BC (12A) in a state where the first pairing between the bicycle component BC (12A) and the first additional bicycle component BC1 (14B) has been reset and the second pairing between the bicycle component BC (12A) and the second additional bicycle component BC2 (14B) is established. Moreover, optionally, the second additional bicycle component BC2 (14B) further comprises a second wired communication circuit 84. Alternatively, the second wired communication circuit 84 can be omitted if needed and/or desired. Using the second wired communication circuit 84, the second additional bicycle component BC2 (14B) can communication with the bicycle component BC (12A) and the third additional bicycle component BC3 (18B) using power line communication (PLC). Basically, referring back to FIG. 6, the second wired communication circuit 84 is configured to be electrically connected to the bicycle component BC (12A) via the first electrical cable 32B. Specifically, referring back to FIG. 6, the second additional bicycle component BC2 (14B) is configured to be electrically connected to the third additional bicycle component BC3 (18B) via the second electrical cable 34B. Thus, the second wired communication circuit 84 is configured to be electrically connected to the bicycle component BC (12A) via the first electrical cable 32B and the second electrical cable 34B. Alternatively, the first electrical cable 32B can be directly connected to the second wired communication circuit 84 and to the bicycle component BC (12A).

The second controller 80 is electrically connected to the second communicator 82. Thus, the second controller 80 is configured to receive data signals from the second communicator 82 and output data signals to the second communicator 82. The second communicator 82 can have its own controller and its own storage device as needed and/or desired. For example, the second controller 80 can be a master controller and the controller of the second communicator 82 can be a slave controller. The second communicator 82 is identical to the communicator 64 discussed above. Thus, the second communicator 82 will not be discussed in further detail. Moreover, the second additional bicycle component BC2 (14B) preferably includes an antenna and a signal amplifier similar to the bicycle component BC (12A).

Here, as illustrated in FIG. 10, the second additional bicycle component BC2 (14B) further comprises a circuit board 85. The circuit board 85 is, for example, a printed circuit board (PCB). The circuit board 85 supports and electrically connects the second controller 80, the storage device 81 and the second communicator 82. While the second controller 80, the storage device 81 and the second communicator 82 are all provided on the circuit board 85, it will be apparent from this disclosure that the bicycle component BC (12A) can have a plurality of circuit boards. For example, the second controller 80 can be provided on a first circuit board, the storage device 81 can be provided on a second circuit board, and the second communicator 82 can be provided on a third circuit board.

Referring to FIGS. 6 and 10, the second additional bicycle component BC2 (14B) comprises a second user interface 86. The second user interface 86 is configured to accept a second user input. Here, the second user interface 86 is provided to the second additional bicycle component BC2 (14B). In particular, as seen in FIG. 6, the second user interface 86 provided to the second additional bicycle component BC2 so as to be easily accessible to a user. As seen in FIG. 10, the second controller 80 is electrically connected to the second wireless communication circuit 84 and the second user interface 86. Here, the second user interface 86 includes a plurality of input devices 86A. Here, the input devices 76A are in the form of buttons that can be used to control the the bicycle component BC (12A) and/or the third additional bicycle component BC3 (18B). Also, the second user interface 86 includes a power interface 86B. The power interface 86B is configured to control power supplied to the bicycle component BC (12A). Here, the power interface 86B is an ON/OFF button for turning the bicycle component BC (12A) on or off. Alternatively, the power interface 86B can be provided on one of the other bicycle components as needed and/or desired.

Still referring to FIGS. 6 and 10, the second additional bicycle component BC2 (14B) further comprises a notification device 87. The notification device 87 is configured to be controlled by the second controller 80. The second controller 80 is configured to control the notification device 87 to produce a notification in response to a second user input being provided to the second user interface 86. Here, in the illustrated embodiment, the notification device 87 includes a light emitting device 87A and a display 87B. The second controller 80 is configured to control the light emitting device 87A and the display 87B based on the data being received and/or the user inputs to the second user interface 86. The display 87B can be a touch panel such that the display 87B function as both the second user interface and the notification device of the the second additional bicycle component BC2 (14B). For example, the display 87B can be an integrated control panel having an OLED display screen that is controlled by the second controller 80 to show a current speed, an average speed, a maximum speed, a ride time, a ride distance, an odometer, etc. Preferably, using the second user interface 86, the user can instruct the second controller 80 to change what and how the data is to be displayed on the display 87B. For example, simple menus can be displayed on the display 87B to allow the user to select between the units (e.g., mph or kmph) and the type of data to be displayed (e.g., gear position, battery level, mode, etc.).

Figure 11:
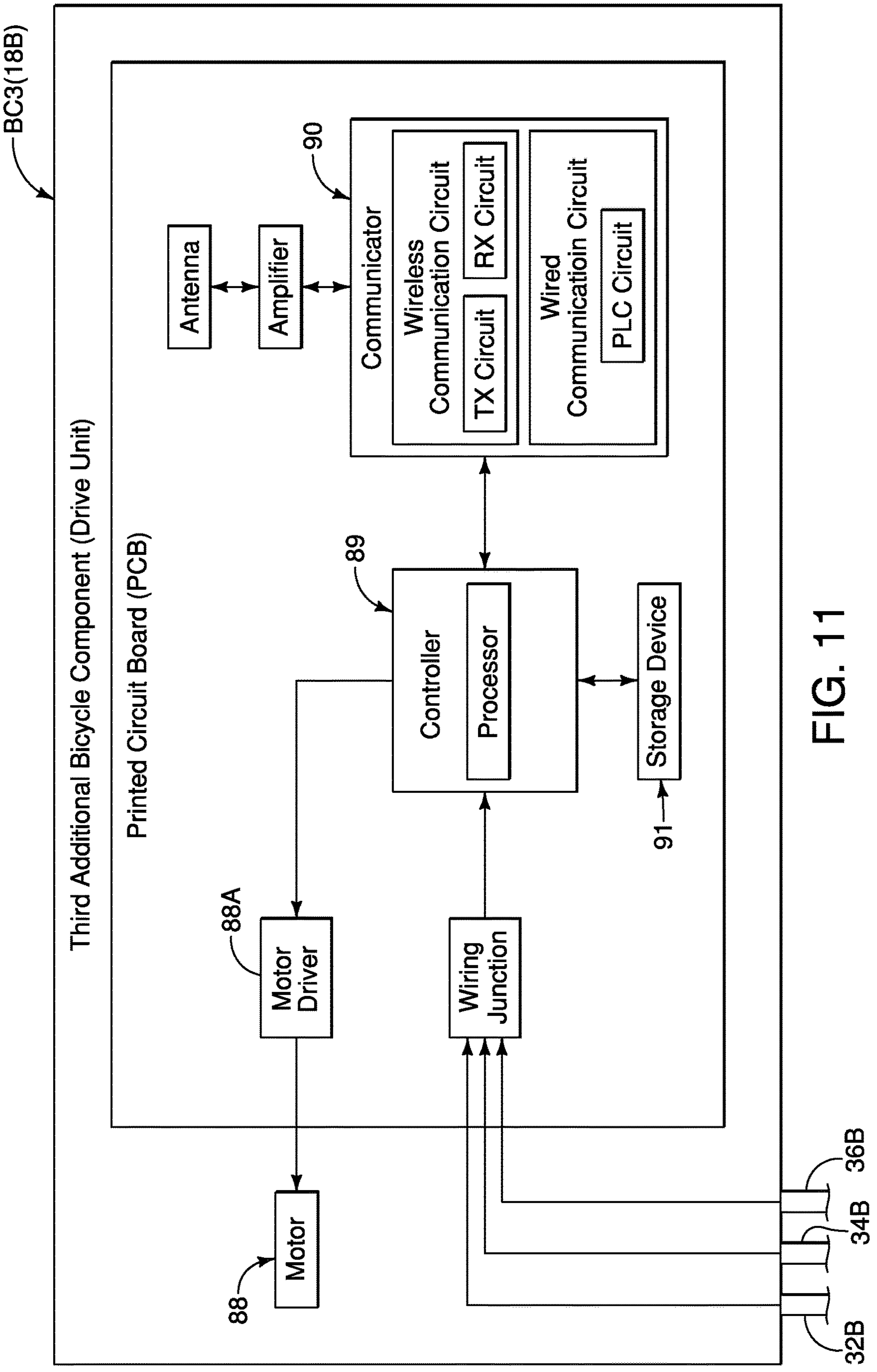
FIG. 11 is a schematic block diagram illustrating various electrical parts of a third additional bicycle component (e.g., the drive unit).

Referring now to FIG. 11, the third additional bicycle component BC3 (18B) will now be discussed in more detail. The drive unit 18A preferably has the same configuration as the third additional bicycle component BC3 (18B). Thus, the following description of the third additional bicycle component BC3 (18B) applies the drive unit 18A. Basically, the third additional bicycle component BC3 (18B) is configured to communicate with the second additional bicycle component BC2 (14B) such that the third additional bicycle component BC3 (18B) can be controlled by the second additional bicycle component BC2 (14B). Here, the third additional bicycle component BC3 (18B) is basically a conventional drive unit. Thus, descriptions of the conventional structures of the third additional bicycle component BC3 (18B) will be omitted for the sake of brevity.

Here, the third additional bicycle component BC3 (18B) is configured to communicate with the second additional bicycle component BC2 (14B) using either wireless communication or wired communication. The third additional bicycle component BC3 (18B) comprises a motor 88 that is configured to input a propulsion force to the drivetrain DT2 of the bicycle B2 of FIG. 3. The third additional bicycle component BC3 (18B) further comprises a controller 89. The motor 88 is controlled by the controller 89 via an actuator driver motor 88*a* in a conventional manner. The controller 89 is configured to control the motor 88 in accordance with an input from the second additional bicycle component BC2 (14B). The third additional bicycle component BC3 (18B) further comprises a communicator 90 that is configured to receive and transmit wireless signals and wired signals. The communicator 90 is functionally identical to the communicators 64 and 82. Thus, the communicator 90 will not be discussed in further detail. Similar to the communicator 64, the wired communication circuit of the communicator 90 can be omitted as needed and/or desired. The third additional bicycle component BC3 (18B) further comprises a storage device 91 for storing data and pairing information such as the device identification ID2 for communicating with the second additional bicycle component BC2 (14B).

Figure 12:
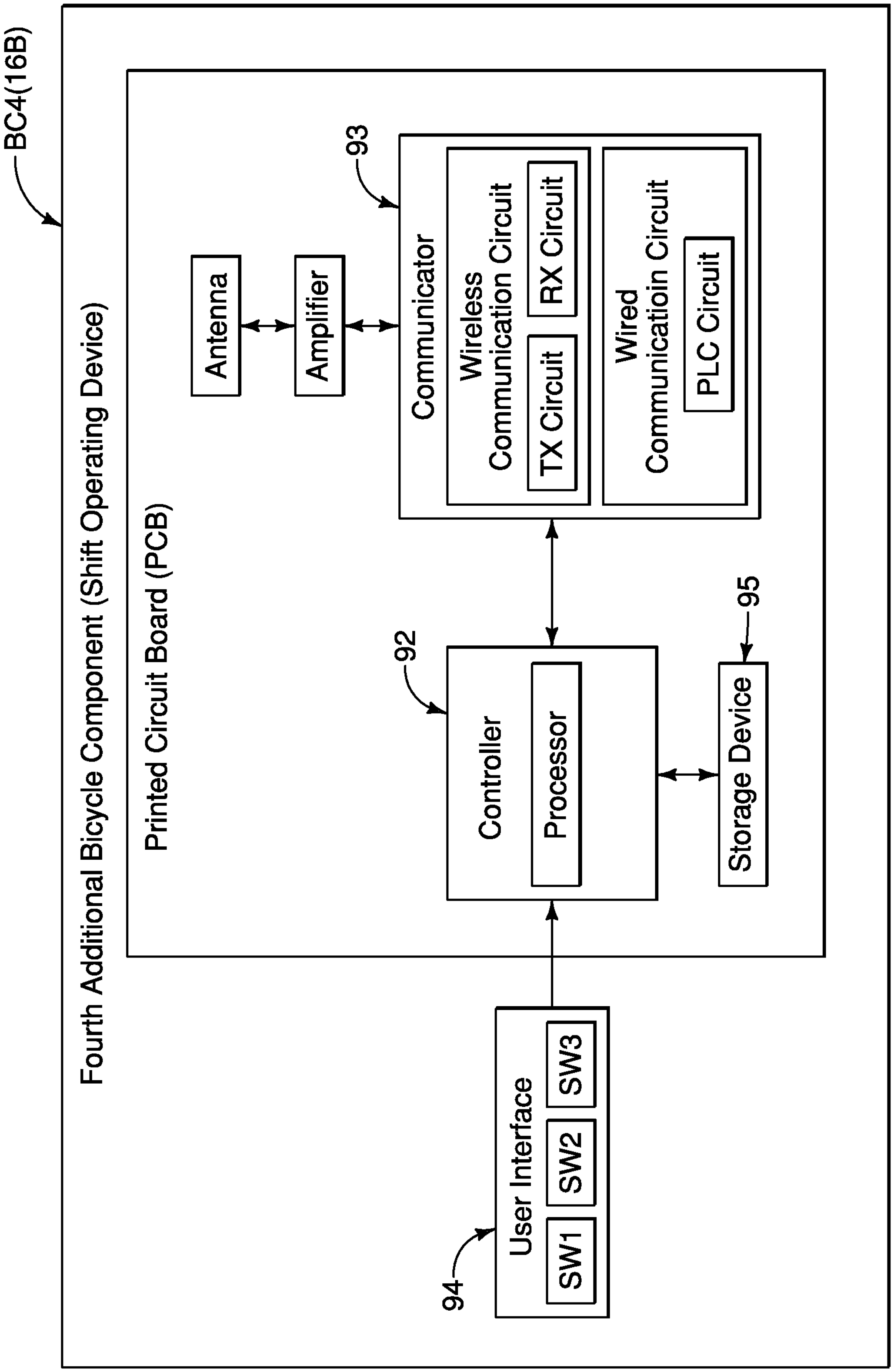
FIG. 12 is a schematic block diagram illustrating various electrical parts of a third additional bicycle component (e.g., the shift operating device).

Referring now to FIG. 12, the fourth additional bicycle component BC4 (16B) will now be discussed in more detail. The shift operating device 16A preferably has the same configuration as the fourth additional bicycle component BC4 (16B). Thus, the following description of the fourth additional bicycle component BC4 (16B) applies the shift operating device 16A. Basically, the fourth additional bicycle component BC4 (16B) is configured to communicate with the bicycle component BC (12A) such that the bicycle component BC (12A) can be controlled by the fourth additional bicycle component BC4 (16B). Here, the fourth additional bicycle component BC4 (16B) is basically a conventional shifting unit. Thus, descriptions of the conventional structures of the fourth additional bicycle component BC4 (16B) will be omitted for the sake of brevity.

Here, the fourth additional bicycle component BC4 (16B) is configured to communicate with the bicycle component BC (12A) using either wireless communication or wired communication. In the illustrated embodiment, the bicycle component BC (12A) is not electrically coupled to the fourth additional bicycle component BC4 (16B) by an electrical cable. However, an electrical cable can be connected directly between the bicycle component BC (12A) and the fourth additional bicycle component BC4 (16B), or between the wiring junction of the third additional bicycle component BC3 (18B) and the fourth additional bicycle component BC4 (16B). In this way, wired communication using power line communication (PLC) can be conducted.

The fourth additional bicycle component BC4 (16B) comprises a controller 92, a communicator 93 and a user interface 94. Here, the user interface 94 includes a plurality of user input devices SW1, SW2 and SW3. For example, the user input devices SW1 and SW2 are lever operated switches that close or open a circuit to generate an electrical signal, while the user input device SW3 is a push button that closes or opens a circuit to generate an electrical signal. The user input devices SW1 and SW2 are preferable shift switches for generating either an upshift signal or a downshift signal. The user input device SW3 can be a mode switch or an adjustment switch.

Basically, the controller 92 is configured to receive user inputs from the user interface 94 and then output controls signals to the communicator 93. The communicator 93 then output controls signals to the bicycle component BC (12A). The communicator 93 is configured to receive and transmit wireless signals and wired signals. Thus, the communicator 93 transmits wireless signals and wired signals to the bicycle component BC (12A) in accordance the user inputs to the user interface 94. In particular, the communicator 64 of the bicycle component BC (12A) receives the shift signal from the bicycle component BC (12A). Then, if the bicycle component BC (12A) is in the manual shifting mode, the actuator 56 is operated by the controller 60 in response to the shift signal. The shift signal can be either an automatic shift signal generated by the second additional bicycle component BC2 (14B) or a cycle computer based on one or more operation conditions of the bicycle B, or a user inputted shift signal generated by the fourth additional bicycle component BC4 (16B) based on a user input. Thus, the bicycle component BC (12A) is configured to shift the chain CN2 between the rear sprockets SP2 in response to either an automatic shift signal from the second additional bicycle component BC2 (14B), or a user inputted shift signal from the fourth additional bicycle component BC4 (16B).

The communicator 93 is functionally identical to the communicators 64 and 82. Thus, the communicator 93 will not be discussed in further detail. The fourth additional bicycle component BC4 (16B) further comprises a storage device 95 for storing data and pairing information such as the device identification ID0 for communicating with the bicycle component BC (12A).

Now, an exemplary process will be discussed for removing the bicycle component BC (12A) from the first bicycle B1 and then installing the bicycle component BC (12A) on the second bicycle B2. Typically, when the bicycle component BC (12A) is installed on the first bicycle B1, the first device identification of the first additional bicycle component BC1 (14B) and the device identification of the shift operating device 16B are stored in the storage device 62 of the bicycle component BC (12A). In this way, the bicycle component BC (12A) can communicate with the first additional bicycle component BC1 (14B) and the shift operating device 16B.

When a user wants to install the bicycle component BC (12A) on the second bicycle B2, the user detaches the bicycle component BC (12A) from the first bicycle B1 and then attaches the bicycle component BC (12A) to the second bicycle B2 in a conventional manner. However, before the bicycle component BC (12A) can be used, it will need to be paired to selected bicycle components of the second bicycle B2.

Here, in accordance with this disclosure, the user performs a reset operation on the bicycle component BC (12A) to clear the device identifications stored in the storage device 62 of the bicycle component BC (12A). The controller 60 is configured to perform the reset operation to reset the first pairing in response to the user input being provided to the user interface 76. For example, the reset operation can be initiated in two ways. First, the user can use the user interface 76 provide to the bicycle component BC (12A) to initiate the reset operation. To put the bicycle component BC (12A) in a resetting mode, the button of the input device 76A is depressed and held for a first predetermined time (e.g., eight seconds to fifteen seconds). The controller 60 is then configured to perform the reset operation after the user input is provided to the user interface 76 for a first predetermined time. Alternatively, the user can use the remote communication device CD, or some other communication device that is remotely located from the bicycle component BC (12A) to initiate the reset operation. Thus, a remote user input can be provided to a remote user interface of the remote communication device CD to start the reset operation. In this way, the controller 60 is configured to perform the reset operation to reset the first pairing in response to a remote user input being provided to a remote user interface of the remote communication device CD. Once the reset operation has been initiated, the controller 60 clears the device identifications stored in the storage device 62 of the bicycle component BC (12A), and enters a listening mode. For example, in the illustrated embodiment, the controller 60 is configured to clear the first device identification ID1 stored in the storage device 62 during the reset operation. In this way, the first additional bicycle component BC1 (14B) cannot communicate with the bicycle component BC (12A) once the first device identification ID1 has been cleared from storage device 62. Likewise, in the illustrated embodiment, the controller 60 is configured to clear the device identification for the shift operating device 16A that is stored in the storage device 62 during the reset operation. In this way, the shift operating device 16A cannot communicate with the bicycle component BC (12A) once its device identification has been cleared from storage device 62.

Next, in order to pair the second additional bicycle component BC2 (14B) to the bicycle component BC (12A) for wireless communication, the user provides a second user input to the second user interface 76 to transmit a pairing request signal to the bicycle component BC (12A). The controller 60 is configured to perform the second pairing in response to the second user input being provided to the second user interface 76. In particular, the controller 60 is configured to control the wireless communication circuit 66 to send a connection signal in response to the second user input. In other words, the wireless communication circuit 66 receives the pairing request signal from the second wireless communication circuit 83, and the controller 60 then controls the wireless communication circuit 66 to send a connection signal back to the second wireless communication circuit 83. In this way, the second controller 80 is configured to perform the second pairing between the bicycle component BC (12A) and the second additional bicycle component BC2 (14B) in response to the second user input being provided to the second user interface 86 where the first pairing between the first additional bicycle component BC1 (14B) and the bicycle component BC (12A) has been reset. In particular, the power interface 86B is operated by the user such that drive unit or power source start to supply electrical power to the rear derailleur 12A. Once electrical power is supplied to the rear derailleur 12A, the rear derailleur 12A automatically starts to pair (e.g., enter pairing mode) the rear derailleur 12A with the remote control unit 14B (the second additional bicycle component BC2). Preferably, the controller 60 is further configured to finish resetting the first pairing before the second pairing is established. However, alternatively, the controller 60 is further configured to start or established the second pairing before the completion of the resetting of the first pairing.

Once the bicycle component BC (12A) and the second additional bicycle component BC2 (14B) are paired, the user can start pairing the bicycle component BC (12A) and the second additional bicycle component BC2 (14B) to the third additional bicycle component BC3 (18B) and/or the fourth additional bicycle component BC4 (16B) as needed and/or desired.

While the present disclosure focused on the relocating the rear derailleur 12A (the bicycle component) from the first bicycle B1 to the second bicycle 2, the above described process of resetting a bicycle component and then pairing the bicycle component to another bicycle component can be applied to any of the other bicycle components (e.g., the bicycle components 16A, 20A, 22A, 24A, 26A, and 28A) equipped with wireless communications.

Also, the user can use the remote communication device CD, or some other communication device that is remotely located from the bicycle component BC (12A) to disable the reset operation of the disable the reset operation if needed and/or desired. In other words, a command can be sent from the remote communication device CD to the bicycle component BC (12A) such that controller 60 is configured to disable the reset operation upon receiving such command from the remote communication device CD.

While the illustrated embodiment discloses the rear derailleur 12A (the bicycle component BC) communicating with the drive unit 18A and the drive unit 18B (i.e., the third additional bicycle component BC3), the first bicycle system 10A and the second bicycle system 10B can have an alternate configuration in which the rear derailleur 12A (the bicycle component BC) does not communicate with the drive unit 18A and the drive unit 18B (i.e., the third additional bicycle component BC3). In other words, in the first bicycle system 10A and the second bicycle system 10B, the electrical cables 32A and 32B only provide electrical power to the rear derailleur 12A (the bicycle component BC), and the drive unit 18A and the drive unit 18B (i.e., the third additional bicycle component BC3) do not have a wireless communication circuit. In this alternate configuration, the remote control unit 14A (i.e., the first additional bicycle component BC1) functions as wireless communication device for the drive unit 18A, and the remote control unit 14B (i.e., the second additional bicycle component BC2) functions as wireless communication device for the drive unit 18B (i.e., the third additional bicycle component BC3). In particular, the remote control unit 14A (i.e., the first additional bicycle component BC1) and the drive unit 18A can be configured to communicate using wired communication, and then the remote control unit 14A (i.e., the first additional bicycle component BC1) wirelessly communicate with the rear derailleur 12A (the bicycle component BC). In this way, the remote control unit 14A (i.e., the first additional bicycle component BC1) communicates with the drive unit 18A using only wired communication, and the remote control unit 14A (i.e., the first additional bicycle component BC1) sends a shift signal to the rear derailleur 12A (the bicycle component BC) based on information received from the the drive unit 18A. Likewise, the remote control unit 14B (i.e., the second additional bicycle component BC2) and the drive unit 18B (i.e., the third additional bicycle component BC3) can be configured to communicate using wired communication, and then the remote control unit 14B (i.e., the second additional bicycle component BC2) wirelessly communicate with the rear derailleur 12A (the bicycle component BC). In this way, the remote control unit 14B (i.e., the second additional bicycle component BC2) communicates with the drive unit 18B (i.e., the third additional bicycle component BC3) using only wired communication. Then, the remote control unit 14B (i.e., the second additional bicycle component BC2) sends a shift signal to the rear derailleur 12A (the bicycle component BC) based on information received from the the drive unit 18B (i.e., the third additional bicycle component BC3).

With this alternate configuration and when the rear derailleur 12A (the bicycle component BC) is mounted to the first bicycle B1, the rear derailleur 12A (the bicycle component BC) performs shifting of the chain CN1 based on a wireless signal from the remote control unit 14A. The wireless signal from the remote control unit 14A to the rear derailleur 12A (the bicycle component BC) includes information received by the remote control unit 14A from the drive unit 18A via wired communication. In other words, for the first bicycle B1, the rear derailleur 12A (the bicycle component BC) performs shifting of the chain CN1 based on information from the drive unit 18A via the wireless signal from the remote control unit 14A. The information from the drive unit 18A includes at least one of torque, cadence, and a time point at which the crank arms CA1 are located at dead center positions. The torque is sensed by a torque sensor. The torque sensor is provided to at least one of the drive unit 18A and one of the crank arms CA1. The cadence is sensed by a cadence sensor. The cadence sensor is provided to at least one of the drive unit 18A and one of the crank arms CA1.

With this alternate configuration and when the rear derailleur 12A (the bicycle component BC) is mounted to the second bicycle B2, the rear derailleur 12A (the bicycle component BC) performs shifting of the chain CN2 based on a wireless signal from the remote control unit 14B (i.e., the second additional bicycle component BC2). The wireless signal from the remote control unit 14B (i.e., the second additional bicycle component BC2) to the rear derailleur 12A (the bicycle component BC) includes information received by the remote control unit 14B (i.e., the second additional bicycle component BC2) from the drive unit 18B (i.e., the third additional bicycle component BC3) via wired communication. In other words, for the second bicycle B2, the rear derailleur 12A (the bicycle component BC) performs shifting of the chain CN2 based on information from the drive unit 18B (i.e., the third additional bicycle component BC3) via the wireless signal from the remote control unit 14B (i.e., the second additional bicycle component BC2). The information from the drive unit 18B (i.e., the third additional bicycle component BC3) includes at least one of torque, cadence, and a time point at which the crank arms CA2 are located at dead center positions. The torque is sensed by a torque sensor. The torque sensor is provided to at least one of the drive unit 18B (i.e., the third additional bicycle component BC3) and one of the crank arms CA2. The cadence is sensed by a cadence sensor. The cadence sensor is provided to at least one of the drive unit 18B (i.e., the third additional bicycle component BC3) and one of the crank arms CA2.

With this alternate configuration, the reset operation of the rear derailleur 12A (the bicycle component BC) is performed in the same manner as discussed above. The reset operation of the rear derailleur 12A (the bicycle component BC) can be configured such that only selected device identifications are cleared from the storage device 62. For example, the reset operation of the rear derailleur 12A (the bicycle component BC) can be configured such that only the device identification ID1 for the remote control unit 14A (i.e., the first additional bicycle component BC1) is cleared from the storage device 62 in response to the reset operation of the user interface 76. Alternatively, the reset operation of the rear derailleur 12A (the bicycle component BC) can be configured such that all device identifications are cleared from the storage device 62 if needed and/or desired.

With this alternate configuration, the remote control unit 14B (i.e., the second additional bicycle component BC2) can be paired with the rear derailleur 12A (the bicycle component BC) by a user input provided to the remote control unit 14B (i.e., the second additional bicycle component BC2). For example, a user operates the power interface 86B to start electric power to the rear derailleur 12A (the bicycle component BC), then the rear derailleur 12A (the bicycle component BC) automatically starts pairing with the remote control unit 14B (i.e., the second additional bicycle component BC2). The shift operating device 16B (i.e., the fourth additional bicycle component BC4) is paired with the rear derailleur 12A (the bicycle component BC) by operating a user input of the shift operating device 16B (i.e., the fourth additional bicycle component BC4) to start the pairing operating between the shift operating device 16B (i.e., the fourth additional bicycle component BC4) and the rear derailleur 12A (the bicycle component BC).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle component. Accordingly, these directional terms, as utilized to describe the bicycle component should be interpreted relative to a bicycle in an upright riding position on a horizontal surface and that is equipped with the bicycle component. The terms "left" and "right" are used to indicate the "right" when referencing from the right side as viewed from the rear of the bicycle, and the "left" when referencing from the left side as viewed from the rear of the bicycle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component comprising:

a wireless communication circuit configured to wirelessly communicate with a first additional bicycle component in a first pairing state where a first pairing between the bicycle component and the first additional bicycle component is established;

a user interface configured to accept a user input; and a controller electrically connected to the wireless communication circuit and the user interface, the controller being configured to perform a reset operation to reset the first pairing in response to the user input being provided to the user interface, the reset operation clearing information associated with the first pairing and another pairing operation not being performed until another user input is received by the user interface.

2. The bicycle component according to claim 1, further comprising a component body provided with the user interface.

3. The bicycle component according to claim 2, wherein the component body includes a base member and a movable mechanism, the base member is configured to be mounted to a bicycle frame, the movable mechanism is configured to move with respect to the base member, and at least one of the base member and the movable mechanism being provided with the user interface.

4. The bicycle component according to claim 1, further comprising:

a circuit board; and a housing, wherein at least one of the user interface and the controller is provided to the circuit board, and the housing accommodates the circuit board, the user interface being exposed on an exterior of the housing.

5. The bicycle component according to claim 1, wherein the controller is configured to perform the reset operation after the user input is provided to the user interface for a first predetermined time.

6. The bicycle component according to claim 1, wherein a notification device is configured to produce a notification in response to the user input being provided to the user interface, the notification device including a light emitting device.

7. The bicycle component according to claim 1, wherein the wireless communication circuit is configured to wirelessly communicate with a second additional bicycle component in a second pairing state where a second pairing between the bicycle component and the second additional bicycle component is established, and the controller is configured to perform the second pairing in response to a second user input being provided to a second user interface.

8. The bicycle component according to claim 7, wherein the controller is configured to perform the reset operation to reset the first pairing in response to a remote user input being provided to a remote user interface of a remote communication device, and the controller is configured to perform the second pairing in response to a second user input being provided to a second user interface.

9. The bicycle component according to claim 7, wherein the controller is configured to control the wireless communication circuit to send a connection signal in response to the second user input.

10. The bicycle component according to claim 7, wherein the second user interface includes a power interface configured to control power supplied to the bicycle component.

11. The bicycle component according to claim 7, further comprising a wired communication circuit configured to be electrically connected to the second additional bicycle component via a first electrical cable.

12. The bicycle component according to claim 7, wherein the second additional bicycle component is configured to be electrically connected to a third additional bicycle component via a second electrical cable.

13. The bicycle component according to claim 12, wherein the controller is electrically connected to an electric power source remote from the bicycle component, the electric power source is electrically connected to the third additional bicycle component.

14. The bicycle component according to claim 12, wherein the second additional bicycle component is configured to communicate with the third additional bicycle component.

15. The bicycle component according to claim 7, wherein the controller is further configured to receive a control signal from a fourth additional bicycle component different from the second additional bicycle component.

16. The bicycle component according to claim 7, wherein the controller is further configured to finish resetting the first pairing before the second pairing is established.

17. The bicycle component according to claim 1, further comprising:

a storage device configured to store a first device identification that identifies the first additional bicycle component as a source of a wireless signal as coming from the first additional bicycle component.

18. The bicycle component according to claim 17, wherein the controller is configured to clear the first device identification stored in the storage device during the reset operation.

19. The bicycle component according to claim 1, wherein the bicycle component includes one of a derailleur, an internal geared hub, a suspension, an adjustable seatpost and a drive unit.

20. A bicycle component comprising:

a wireless communication circuit configured to wirelessly communicate with a first additional bicycle component in a first pairing state where a first pairing between the bicycle component and the first additional bicycle component is established, the wireless communication circuit being configured to wirelessly communicate with a second additional bicycle component in a second pairing state where a second pairing between the bicycle component and the second additional bicycle component is established; and a controller electrically connected to the wireless communication circuit, the controller being configured to perform a reset operation to reset the first pairing in response to a remote user input being provided to a remote user interface of a remote communication device, the controller being configured to perform the second pairing in response to a second user input being provided to a second user interface of the second additional bicycle component, the reset operation clearing information associated with the first pairing and the second pairing operation not being performed until the second user input is received by the second user interface of the second additional bicycle component, the second user interface being separate from the remote user interface.

21. A second additional bicycle component comprising:

a second wireless communication circuit configured to wirelessly communicate with a bicycle component in a state where a first pairing between the bicycle component and a first additional bicycle component has been reset by a reset operation and a second pairing between the bicycle component and the second additional bicycle component is established by a second pairing operation;

a second user interface configured to accept a second user input; and a second controller electrically connected to the second wireless communication circuit and the second user interface, the second controller being configured to perform the second pairing between the bicycle component and the second additional bicycle component in response to the second user input being provided to the second user interface where the first pairing between the first additional bicycle component and the bicycle component has been reset, the second user interface including a power interface configured to control power supplied to the bicycle component, the reset operation clearing information associated with the first pairing and the second pairing operation not being performed until the second user input is received by the second user interface of the second additional bicycle component, the second additional bicycle component being separate from the first additional bicycle component.

22. The second additional bicycle component according to claim 21, further comprising a second wired communication circuit configured to be electrically connected to the bicycle component via a first electrical cable.

23. The second additional bicycle component according to claim 21, wherein the second additional bicycle component is configured to be electrically connected to a third additional bicycle component via a second electrical cable.

24. The second additional bicycle component according to claim 23, wherein the second controller is electrically connected to an electric power source remote from the second additional bicycle component, the electric power source is electrically connected to the third additional bicycle component.

25. The second additional bicycle component according to claim 23, wherein the second additional bicycle component is configured to operate the third additional bicycle component differently from the bicycle component.

26. A bicycle component comprising:

a wireless communication circuit configured to wirelessly communicate with a first additional bicycle component in a first pairing state where a first pairing between the bicycle component and the first additional bicycle component is established;

a user interface configured to accept a user input; and a controller electrically connected to the wireless communication circuit and the user interface, the controller being configured to perform a reset operation to reset the first pairing in response to the user input being provided to the user interface, the reset operation clearing information associated with the first pairing and another pairing operation not being performed until another user input is received by the first additional bicycle component.

* * * * *